United States Patent
Okita et al.

(10) Patent No.: US 8,751,637 B2
(45) Date of Patent: Jun. 10, 2014

(54) NETWORK MONITORING SERVER AND NETWORK MONITORING SYSTEM

(75) Inventors: Hideki Okita, Yokohama (JP); Masahiro Yoshizawa, Kawasaki (JP); Keitaro Uehara, Machida (JP)

(73) Assignee: Hitachi, Ltd., Tokyo (JP)

( * ) Notice: Subject to any disclaimer, the term of this patent is extended or adjusted under 35 U.S.C. 154(b) by 580 days.

(21) Appl. No.: 12/980,606

(22) Filed: Dec. 29, 2010

(65) Prior Publication Data
US 2011/0238817 A1    Sep. 29, 2011

(30) Foreign Application Priority Data

Mar. 25, 2010    (JP) .................. 2010-069503

(51) Int. Cl.
*G06F 15/173*    (2006.01)
*H04L 12/24*    (2006.01)
*H04L 12/26*    (2006.01)

(52) U.S. Cl.
CPC .......... *H04L 43/0817* (2013.01); *H04L 41/142* (2013.01)
USPC ........................................ 709/224; 709/223

(58) Field of Classification Search
USPC ........................................................ 709/224
See application file for complete search history.

(56) References Cited

U.S. PATENT DOCUMENTS

| | | | | |
|---|---|---|---|---|
| 6,098,109 A | * | 8/2000 | Kotzur et al. | 709/249 |
| 6,675,209 B1 | * | 1/2004 | Britt | 709/224 |
| 2001/0056486 A1 | | 12/2001 | Kosaka | |

FOREIGN PATENT DOCUMENTS

| | | |
|---|---|---|
| JP | 2001-356972 A | 12/2001 |
| JP | 2004-215026 A | 7/2004 |
| JP | 2007-328522 A | 12/2007 |
| JP | 2009-130474 A | 6/2009 |

OTHER PUBLICATIONS

IEEE Computer Society "Virtual Bridged Local Area Networks, Amendment 5: Connectivity Fault Management", IEEE Standard for Local and Metropolitan Area Networks, Dec. 17, 2007, pp. 117-124.
J. Postel, Darpa Internet Program Protocol Specification, Networking Working Group Request for Comments: 792, Sep. 1981, pp. 1-21.
Japanese Office Action Dated May 16, 2013 {One (1) Page}.

* cited by examiner

*Primary Examiner* — Douglas Blair
*Assistant Examiner* — Angela Nguyen
(74) *Attorney, Agent, or Firm* — Crowell & Moring LLP

(57) ABSTRACT

A failure factor can be promptly carved up by effectively prioritizing the ports to which MEPs are assigned in a condition where the maximum number of MEPs is limited. A network monitoring server monitors a network having plural switch devices. The plural switch devices each have a communication confirmation function using transmission and reception of a monitoring frame between ports. An upper limit is set to the number of ports to which maintenance end points (MEPs) are assignable among the respective ports of the plural switch devices. The network monitoring server calculates, for each of the plural switch devices, a monitoring priority corresponding to the probability of failures of a device connected to a network path including the port or the port, and generates data for displaying the calculated monitoring priority of each port in association with each port.

17 Claims, 29 Drawing Sheets

| SWITCH | PORT | DIRECTION | MEG LEVEL | MEG_ID | MEP_ID |
|---|---|---|---|---|---|
| sw01 | 0/24 | UP | 4 | "VLAN100" | 1 |
| sw21 | 0/1 | UP | 4 | "VLAN100" | 2 |
| sw21 | 0/2 | UP | 4 | "VLAN100" | 3 |
| sw22 | 0/1 | UP | 4 | "VLAN100" | 4 |
| sw22 | 0/2 | UP | 4 | "VLAN100" | 5 |
|  |  |  |  |  |  |

| DEVICE NAME | DEVICE TYPE | DEPLOYMENT TIME |
|---|---|---|
| sw01 | SWITCH | 2004/01/01 00:00 |
| sw11 | SWITCH | 2004/01/01 00:00 |
| sw12 | SWITCH | 2004/01/01 00:00 |
| sw21 | SWITCH | 2005/01/01 00:00 |
| sw22 | SWITCH | 2005/01/01 00:00 |
| sw23 | SWITCH | 2006/01/01 00:00 |
| sw24 | SWITCH | 2006/01/01 00:00 |
| www1 | SERVER | 2006/01/01 00:00 |
| app1 | SERVER | 2007/01/01 00:00 |
| vwww1 | VIRTUAL MACHINE | 2009/01/01 00:00 |
|  |  |  |

| TIME | SERVER ID | OPERATION TYPE | CONNECTED SWITCH | CONNECTED PORT | SOURCE SWITCH | SOURCE PORT | DESIGNATED DESTINATION |
|---|---|---|---|---|---|---|---|
| 2006/01/01 00:00 | www1 | ADD | sw21 | 0/1 |  |  | WAN |
| 2007/01/01 00:00 | app1 | ADD | sw22 | 0/1 |  |  | www1 |
| 2008/01/01 00:00 | www1 | MIGRATION | sw21 | 0/2 | sw21 | 0/1 |  |
|  |  |  |  |  |  |  |  |

| TIME | SERVER ID | OPERATION TYPE | OPERATING HOST | USE PORT | SOURCE HOST | USE PORT |
|---|---|---|---|---|---|---|
| 2009/01/01 00:00 | vwww1 | ADD | www1 | eth0 |  |  |
|  |  |  |  |  |  |  |

| SWITCH | PORT | CONNECTED DEVICE | MONITORING PRIORITY | SWITCH DEGRADATION FAILURE RATE | SERVER DEGRADATION FAILURE RATE | SERVER INITIAL FAILURE RATE | CHANGE-RELATED FAILURE RATE |
|---|---|---|---|---|---|---|---|
| sw21 | 0/2 | www1 | 62.33 | 22.61% | 19.75% | 0% | 39.34% |
| sw22 | 0/1 | app1 | 31.95 | 21.18% | 13.67% | 0% | 0% |
|  |  |  |  |  |  |  |  |

| MONITORING PRIORITY | PORT | SWITCH | TYPE | SWITCH PERMISSIBLE MEP NUMBER | NW PERMISSIBLE MEP NUMBER | MEP CONFIGURATION TARGET |
|---|---|---|---|---|---|---|
| 100 | 0/1 | sw21 | Type5000 | 10 | 10 | ○ |
| 90 | 0/1 | sw22 | Type5000 | 10 | 10 | ○ |
| 80 | 0/2 | sw22 | Type5000 | 10 | 10 | ○ |
| 70 | 0/2 | sw21 | Type5000 | 10 | 10 | ○ |
| 60 | 0/1 | sw23 | Type1000 | 5 | 5 | ○ |
| 50 | 0/2 | sw23 | Type1000 | 5 | 5 | |
| 40 | 0/1 | sw24 | Type10000 | 1000 | 5 | |
| 30 | 0/2 | sw24 | Type10000 | 1000 | 5 | |
| | | | | | | |

| SELECTION TIME | MEP-ASSIGNED PORT | |
|---|---|---|
| 2005/01/01 00:00 | | ~1441 |
| 2006/01/01 00:00 | sw21 0/1 | ~1442 |
| 2007/01/01 00:00 | sw21 0/1, sw22 0/1 | ~1443 |
| 2008/01/01 00:00 | sw21 0/2, sw22 0/1 | ~1444 |
| 2009/01/01 00:00 | sw21 0/2, sw22 0/1 | ~1445 |

| CONFIGURATION EXECUTION TIME | OPERATION TYPE | SUBJECT SWITCH | SUBJECT PORT | |
|---|---|---|---|---|
| 2006/01/01 00:00 | ADD | sw21 | 0/1 | ~1451 |
| 2007/01/01 00:00 | ADD | sw22 | 0/1 | ~1452 |
| 2008/01/01 00:00 | DELETE | sw21 | 0/1 | ~1453 |
| 2008/01/01 00:00 | ADD | sw21 | 0/2 | ~1454 |
| | | | | |

FIG. 29

| SWITCH | ETHERNET OAM SUPPORT |
|---|---|
| sw01 | YES |
| sw11 | YES |
| sw12 | YES |
| sw31 | NO |
| sw32 | NO |
| sw33 | NO |
| sw34 | NO |
|  |  |

| SERVER | FAILURE RATE | ACCOMMODATION SWITCH | ACCOMMODATION PORT | |
|---|---|---|---|---|
| www3 | 35.0% | sw11 | 0/1 | ~1471 |
| www4 | 30.0% | sw11 | 0/1 | ~1472 |
| www5 | 20.0% | sw11 | 0/2 | ~1473 |
| www6 | 15.0% | sw11 | 0/2 | ~1474 |
| | | | | |
| | | | | |
| | | | | |
| | | | | |

```
<?xml version= "1.0" ?>                    3201
<event>
   <type>serveradd</type>
   <occurred>2006/01/01</occurred>
   <server>
      <hostname>www1</hostname>
      <netif>eth0</netif>
   </server>
   <targetport>
      <switch>sw21</switch>
      <port>0/1</port>
   </targetport>
   <destination>WAN</destination>
</event>
```

FIG. 34B

```
<?xml version= "1.0" ?>                    3202
<event>
   <type>servermove</type>
   <occurred>2008/01/01</occurred>
   <server>
      <hostname>www1</hostname>
      <netif>eth0</netif>
   </server>
   <targetport>
      <switch>sw21</switch>
      <port>0/2</port>
   </targetport>
   <sourceport>
      <switch>sw21</switch>
      <port>0/1</port>
   </sourceport>
</event>
```

FIG. 35A

```
<?xml version= "1.0" ?>                    3301
<event>
   <type>vmadd</type>
   <occurred>2009/01/01</occurred>
   <virtualmachine>
      <hostname>vwww1</hostname>
      <netif>vnic0</netif>
   </virtualmachine>
   <targetserver>
      <hostname>www1</hostname>
      <netif>eth0</netif>
   </targetserver>
</event>
```

FIG. 35B

```
<?xml version= "1.0" ?>                    3302
<event>
   <type>vmmove</type>
   <occurred>2010/01/01</occurred>
   <virtualmachine>
      <hostname>vwww1</hostname>
      <netif>vnic0</netif>
   </virtualmachine>
   <targetserver>
      <hostname>www2</hostname>
      <netif>eth0</netif>
   </targetserver>
   <sourceserver>
      <hostname>www1</hostname>
      <netif>eth0</netif>
   </sourceserver>
</event>
```

NETWORK MONITORING SERVER AND NETWORK MONITORING SYSTEM

CLAIM OF PRIORITY

The present application claims priority from Japanese patent application JP 2010-069503 filed on Mar. 25, 2010, the content of which is hereby incorporated by reference into this application.

FIELD OF THE INVENTION

The present invention relates to a network monitoring server, and more particularly to a network monitoring server that manages a failure monitoring function provided in a network device in order to detect a failure in a communication network.

BACKGROUND OF THE INVENTION

Up to now, for the purpose of confirming a communication of a wide area network, a method in which monitoring frames are periodically transmitted from a port at an end point of a path, and the reception of the frames is confirmed at an opposed port has been widely used. In particular, in the Ethernet network, an Ethernet (registered trademark) OAM (operations administration maintenance, refer to IEEE 802.1ag Connectivity Fault Management (CFM)) is used.

In addition, in association with the technique of confirming the communication in the network, a technique disclosed in JP-A-2004-215026 has been known. In the technique disclosed in JP-A-2004-215026, a monitor frequency value corresponding to each importance degree is set in each device within the network. Each device is monitored on the basis of the monitoring frequency value to monitor a failure in the network.

Also, in the general information system, in many cases, a server manager monitors the operating condition of a server (refer to JP-A-2001-356972 and IETF RFC 792 Internet Control Message Protocol (ICMP)). JP-A-2001-356972 discloses a technique in which a monitor server transmits a monitor packet to plural servers to be monitored within the network, thereby managing the operating condition of the server. IETF RFC 792 Internet Control Message Protocol (ICMP) discloses a technique in which, particularly in an IP network, ping utilizing an internet control message protocol (ICMP) echo is used to monitor the operating condition of the server.

Also, in a large-scaled information system such as a data center, in many cases, a manager is placed at each of servers and networks. For that reason, when a failure occurs in a service which is supplied in the information system, there is a need to promptly carve up the cause of errors among those managers. As a method for carving up the failure factor, there is a method combining the above-mentioned ping and Ethernet OAM together.

In this method, each server manager and each network manager monitor the server and the network by using the ping and the Ethernet OAM, respectively. Thereafter, those monitored results are checked with each other to carve up the failure factor. More specifically, when the server manager detects the service failure by using the ping, the network manager examines a maintenance endpoint (hereinafter referred to as "MEP") to be monitored by the Ethernet OAM of the port connected with the server. The network manager determines that the failure factor exists at the network side when a failure is detected in the result of the Ethernet OAM. Conversely, the network manager determines that the failure factor exists at the server side when no failure is detected in the result of the Ethernet OAM.

SUMMARY OF THE INVENTION

However, the above-mentioned method combining the ping and the Ethernet OAM together to carve up the failure factor has suffered from a problem on scalability.

That is, the Ethernet OAM is a technique used in the wide area network having connection points of several tens at a maximum. That is, in the large-scaled information system, the network manager needs to reduce the number of locations for configuring the MEPs to several tens in order to suppress a control load on a switch. For that reason, when the port connected with the server that has been in failure is not a port to which the MEP has been assigned (hereinafter referred to as "MEP-assigned port"), it takes time to carve up the failure factor.

On the contrary, there is proposed a method in which the MEP-assigned port is selected on the basis of the switch priority by analogizing the technique disclosed in JP-A-2004-215026. In this case, the importance degree of the switch becomes higher as the number of servers accommodated by the switch is larger. However, in this method, a port of a core switch is selected preferentially, and a range where the communication can be confirmed is limited to the vicinity of the core switch. This leads to such a problem that it cannot be determined at all whether the failure factor exists within the network, or not.

The present invention has been made to solve the above problem, and aims at providing a network monitoring server and a network monitoring system, which can promptly carve up the failure factor by effectively prioritizing the ports to which the MEPs are assigned in a condition where the maximum number of MEPs is limited.

A typical example of the present invention disclosed in the present application will be described below. That is, there is provided a network monitoring server that monitors a network having a plurality of switch devices in which each of the plurality of switch devices has a communication confirming function using transmission and reception of a monitoring frame between ports, and an upper limit is set to the number of ports to which maintenance end points can be assigned among the respective ports of the plurality of switch devices, the network monitoring server comprising: a processor that executes a program; a memory that stores the program executed by the processor therein; and an interface connected to the processor, wherein the processor calculates, for each of the plurality of switch devices, a monitoring priority corresponding to the probability of failures of a device connected to a network path including the port or the port, and generates data for displaying the calculated monitoring priority of each port in association with each port.

According to the network monitoring server and the network monitoring system of the present invention, the ports to which the MEPs are assigned are effectively prioritized in a condition where the maximum number of MEPs is limited, thereby enabling the failure factor to be promptly carved up.

BRIEF DESCRIPTION OF THE DRAWINGS

FIG. 11 is a table showing a configuration example of device deployment information according to the first embodiment of the present invention;

FIG. 12 is a table showing a configuration example of server migration information according to the first embodiment of the present invention;

FIG. 13 is a table showing a configuration example of virtual machine migration information according to the first embodiment of the present invention;

FIG. 19 is a table showing an example of MEP-assigned port selection information according to the first embodiment of the present invention;

FIG. 23 is a table showing a configuration example of MEP configuration schedule according to the second embodiment of the present invention;

FIG. 24 is a table showing a configuration example of MEP configuration procedure according to the second embodiment of the present invention;

FIG. 29 is a table showing a configuration example of switch model information according to the fourth embodiment of the present invention;

FIG. 31 is a table showing a configuration example of server failure rate information according to the fourth embodiment of the present invention;

FIG. 34A is a diagram showing a first example of a configuration change notification message according to the fifth embodiment of the present invention.

FIG. 34B is a diagram showing a second example of the configuration change notification message according to the fifth embodiment of the present invention;

FIG. 35A is a diagram showing a third example of the configuration change notification message according to the fifth embodiment of the present invention; and FIG. 35B is a diagram showing a fourth example of the configuration change notification message according to the fifth embodiment of the present invention.

DETAILED DESCRIPTION OF THE PREFERRED EMBODIMENTS

Hereinafter, the respective embodiments of the present invention will be described with reference to the accompanying drawings.

First Embodiment

A network monitoring server according to a first embodiment of the present invention monitors a network in which all ports of all switches within the network belong to a single Ethernet network, and Ethernet frames can be transmitted and received between the servers connected to those ports. The network monitoring server according to the first embodiment of the present invention can be also applied to a network that belongs to a single VLAN in which all the ports of all the switches within the network a-re represented by the same virtual LAN (VLAN) identifier.

Figure 1:
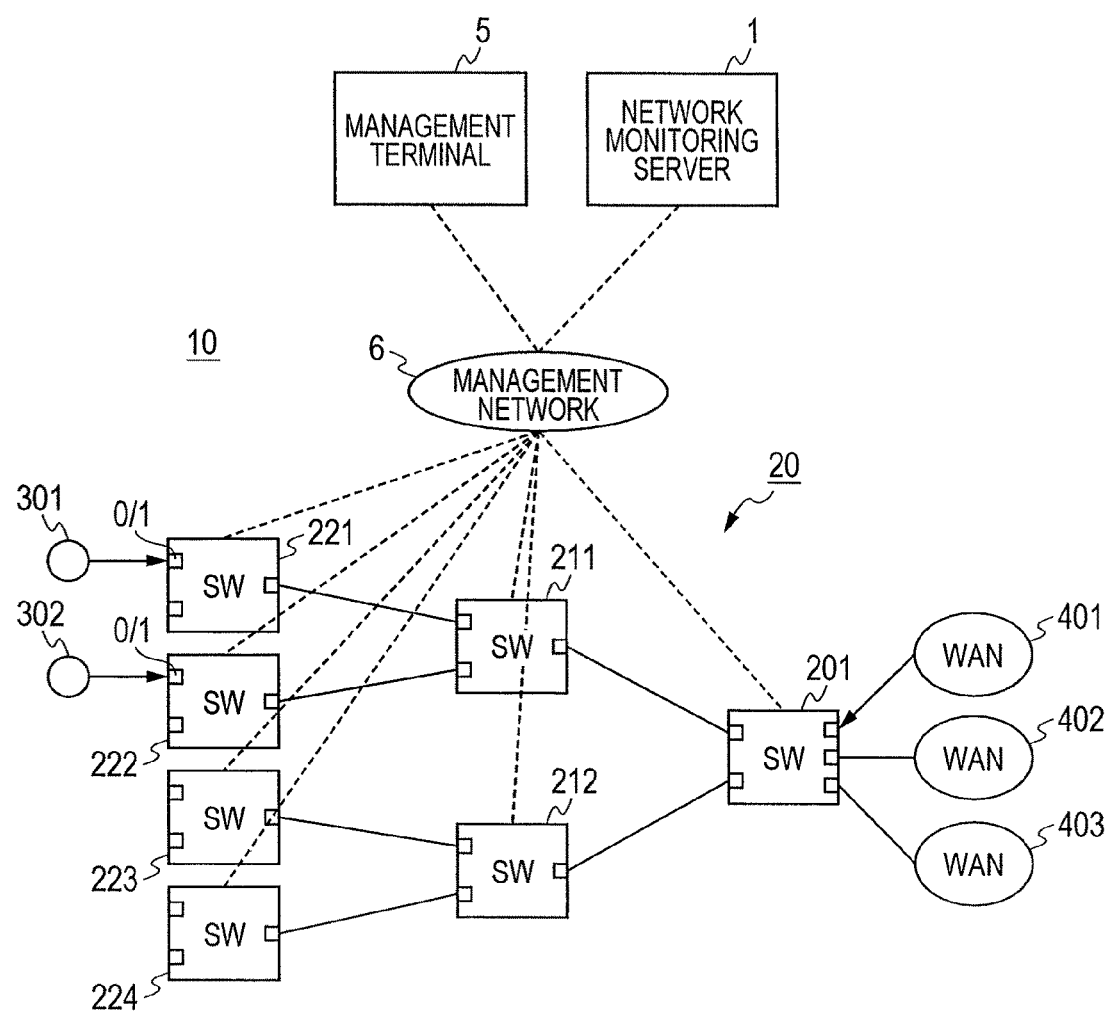
FIG. 1 is a diagram illustrating a configuration example of a network monitoring system according to a first embodiment of the present invention.

FIG. 1 illustrates a configuration example of a network monitoring system 10 according to the first embodiment of the present invention. The network monitoring system 10 includes a network monitoring server 1, switches to be monitored (hereinafter, referred to simply as "switches") 201 to 224, servers 301 and 302, wide area networks (WANs) 401 to 403, a management terminal 5, and a management network 6.

The network monitoring server 1 manages maintenance end points (MEPs) of an Ethernet OAM which have been assigned to the respective switches 201 to 224 within a network 20, through the management network 6.

The switches 201 to 224 are a switch group in which the respective switches are connected in a tree shape with the switch 201 as a vertex. The switch 201 is a core switch that connects the WANs 401 to 403. The switches 221 to 224 are edge switches that connect the servers (in this example, the servers 301 and 302). The switches 211 and 212 are middle switches that connect the core switch and the edge switches.

Those switches 221 to 224 each have a function of the Ethernet OAM. That is, the MEP assigned to each port of those switches 221 to 224 periodically transmits a monitoring frame within the network 20. The MEP receives the monitoring frames transmitted from the other MEPs, and manages a communication condition with the other MEPs.

The server 301 is a computer device connected to a port 0/1 of the switch 221. The server 302 is a computer device connected to a port 0/1 of the switch 222. The management terminal 5 is a computer device connected to the network management server 1 through the management network 6.

The management network 6 connects the network monitoring server 1, the switches 201 to 224, and the management terminal 5. The network monitoring server 1, the switches 201 to 224, and the management terminal 5 can transmit and receive management frames through the management network 6 with respect to each other.

Figure 2:
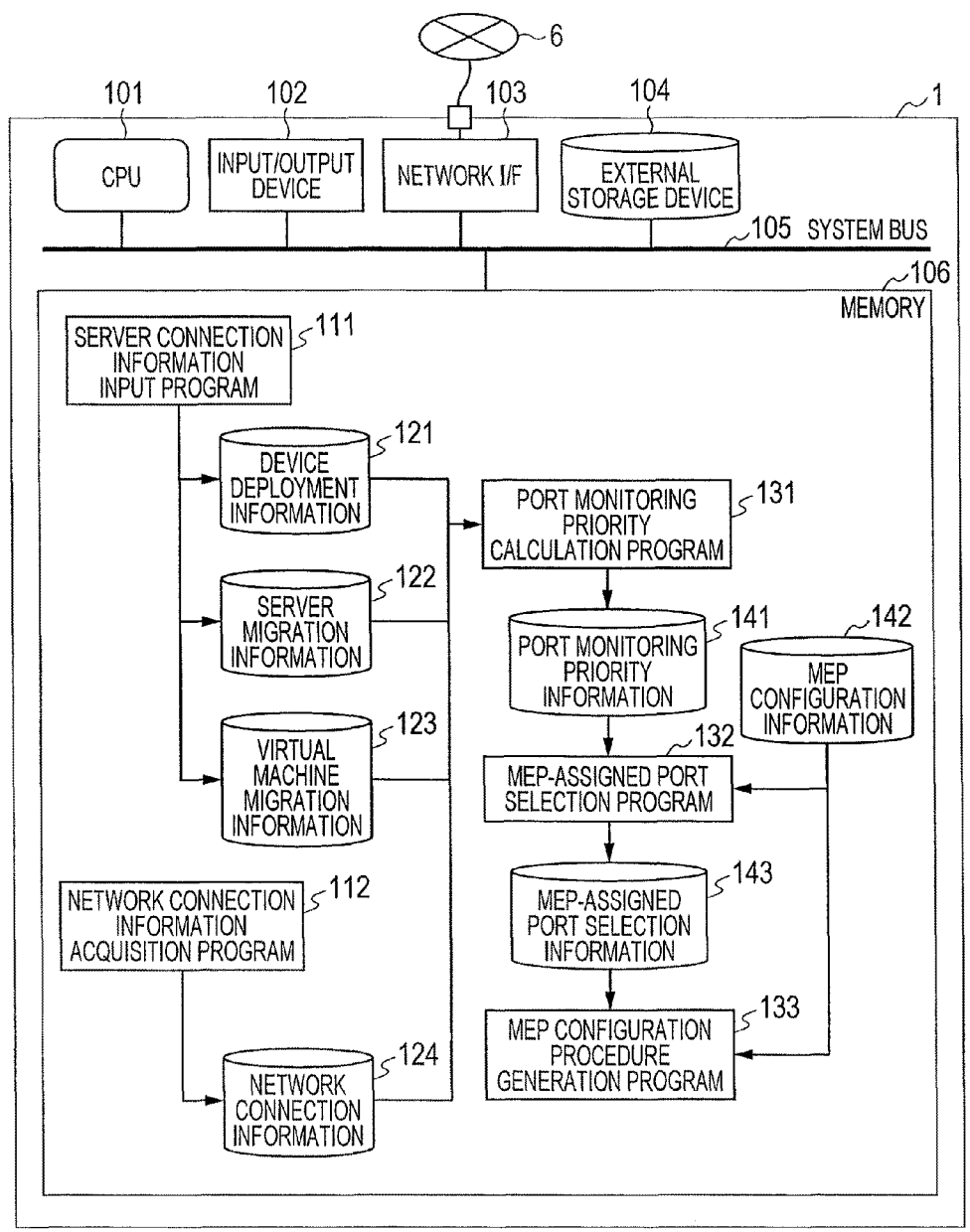
FIG. 2 is a diagram illustrating a configuration example of a network monitoring server according to the first embodiment of the present invention.

FIG. 2 is a diagram illustrating a configuration example of the network monitoring server 1 according to the first embodiment of the present invention. The network monitoring server 1 includes a CPU 101, an input/output device 102, a network I/F 103, an external storage device 104, a system bus 105, and a memory 106.

The memory 106 stores therein a server connection information input program 111, a network connection information acquisition program 112, device deployment information 121, server migration information 122, virtual machine migration information 123, and network connection information 124. The memory 106 also stores therein a port monitoring priority calculation program 131, an MEP-assigned port selection program 132, an MEP configuration procedure generation program 133, port monitoring priority information 141, MEP configuration 142, and an MEP-assigned port selection information 143.

Those programs and data are expanded on the memory 106 from the external storage device 104 at the time of starting the network monitoring server 1. The CPU 101 executes the programs expanded on the memory 106. Those programs and data will be described in detail later.

The server connection information input program 111 accepts an input of a network manager from the input/output device 102 such as a keyboard, or from the management terminal 5 (not shown) through the network I/F 103 and the management network 6. The server connection information input program 111 updates the device deployment information 121, the server migration information 122, and the virtual machine migration information 123 on the basis of the input contents of the network manager.

Like the server connection information input program 111, the network connection information acquisition program 112 accepts the input of the network manager. The network connection information acquisition program 112 collects management information of the switches 201 to 224 directly from the switches 201 to 224 (not shown) through the network I/F 103 and the management network 6. The network connection information acquisition program 112 updates the network connection information 124 on the basis of the input contents of the network manager or the management information collected from the switches 201 to 224.

The network connection information 124 is typically the assembly of information on link states representative of the combinations of the opposed switches 201 to 224. The link state information is constructed on the basis of the information acquired through the following method, for example. That is, the network manager first operates a link layer discovery protocol (LLDP) stipulated by IEEE802.1AB by the switches 201 to 224. Thereafter, the network manager acquires the information of the opposed switches 201 to 224 for each of the ports of the switches 201 to 224, from management information bases (LLDP MIBs) retained by the respective switches 201 to 224. The network manager may acquire the link state information directly or indirectly from the external network management server that retains topology information of the network.

The port monitoring priority calculation program 131 calculates the monitoring priority for each port of the switches 201 to 224 on the basis of the device deployment information 121, the server migration information 122, the virtual machine migration information 123, and the network connection information 124. The port monitoring priority calculation program 131 updates the port monitoring priority information 141 on the basis of the calculated result.

The MEP-assigned port selection program 132 selects a port to which the MEP is to be assigned from the ports of the switches 201 to 224 on the basis of the port monitoring priority information 141 and the MEP configuration 142. The MEP-assigned port selection program 132 updates the MEP-assigned port selection information 143 on the basis of the selected result.

The MEP configuration procedure generation program 133 calculates which port the MEP is to be assigned to, on the basis of the MEP configuration 142 and the MEP-assigned port selection information 143, and provides the calculated port to the network manager.

Figure 3:
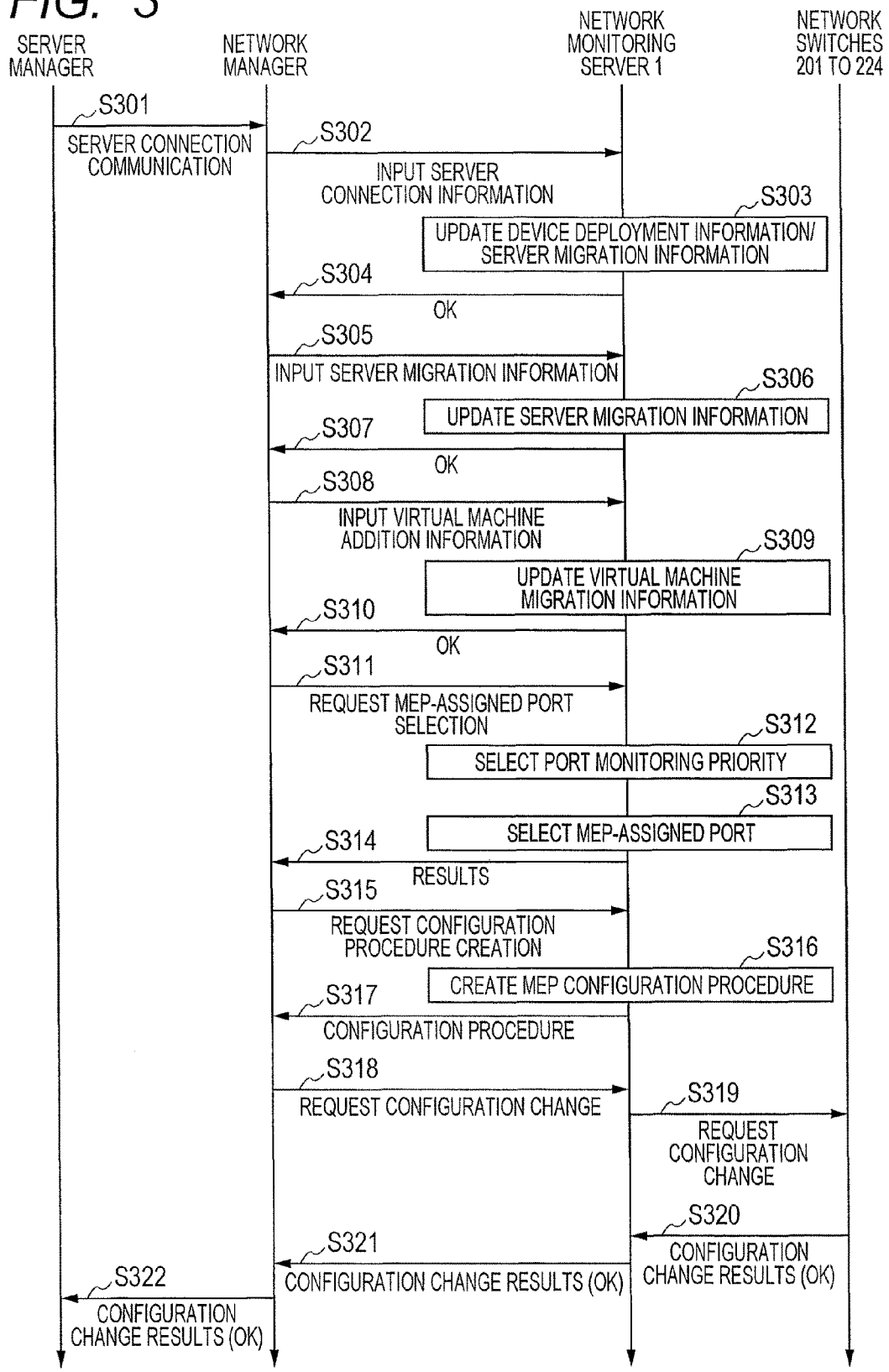
FIG. 3 is a sequence diagram illustrating a control logic of the network monitoring system according to the first embodiment of the present invention.

FIG. 3 is a sequence diagram illustrating a control logic of the network monitoring system 10 according to the first embodiment of the present invention. In this example, a description will be given of a processing sequence in which the network monitoring server 1 selects the port to which the MEP is to be assigned from the respective ports of the switches 201 to 224, and assigns the MEP to the selected port.

First, the server manager communicates, to the network manager, a schedule for connection to the server (S301). In this example, the server manager communicates, to the network manager, a name for uniquely discriminating a server to be connected, a type of the server, an identifier of a connected switch with the server, an identifier of a connected port, and date and time for connection to the server.

Then, the network manager inputs, to the network monitoring server 1, information on the server to be newly connected to the network according to the communication contents of the server manager (S302). Thereafter, the network monitoring server 1 updates the device deployment information 121 and the server migration information 122 according to the input contents of the network manager (S303), and returns the updated result to the network manager (S304).

Also, the network manager inputs, to the network monitoring server 1, information on a server whose connection target has been changed within the network, according to the communication contents of the server manager in S301 (S305). Thereafter, the network monitoring server 1 updates the server migration information 122 according to the input contents of the network manager (S306), and returns the updated result to the network manager (S307).

Also, the network manager inputs, to the network monitoring server 1, information on the addition of a virtual machine to a physical server within the network and the migration of the virtual machine between the physical servers within the network, according to the communication contents of the server manager in S301 (S308). Thereafter, the network monitoring server 1 updates the virtual machine migration information 123 according to the input contents of the network manager (S309), and returns the updated result to the network manager (S310).

Upon completion of S302 to S310, the network monitoring server 1 instructs the network monitoring server 1 to select the combination of the ports to which the MEP is to be assigned within the network at a given time point (S311). Upon receiving the instruction, the network monitoring server 1 first calculates the monitoring priority for each port of the switches within the network on the basis of the device deployment information 121, the server migration information 122, the virtual machine migration information 123, and the network connection information 124, which have been updated (S312). Thereafter, the network monitoring server 1 selects a list (assembly) of the ports to which the MEP is to be assigned from the ports within the network, on the basis of the calculated monitoring priority for each port (S313). Thereafter, the network monitoring server 1 notifies the network manager of the list of the selected ports (S314).

Upon confirming the contents of the list of the ports notified in S314, the network manager instructs the network monitoring server 1 to generate an MEP configuration procedure (a procedure for changing the configuration of the MEP) (S315). Upon receiving the instruction, the network monitoring server 1 compares the selected list of the ports with a list of the ports (MEP-assigned ports) to which the MEP has been presently assigned, to calculate a difference between those lists. Then, the network monitoring server 1 generates the MEP configuration procedure on the basis of the calculated difference between those lists (S316), and provides the generated MEP configuration procedure to the network manager (S317).

Upon confirming that there is no problem in the contents of the MEP configuration procedure provided in S317, the network manager provides a configuration change to the network monitoring server 1 (S318). Upon receiving the instruction, the network monitoring server 1 instructs the switches 201 to 224 whose MEP configuration is changed to conduct the MEP configuration change, on the basis of the MEP configuration procedure (S319). Upon receiving the instruction from the network monitoring server 1, the switches 201 to 224 change the MEP configuration, and return the MEP configuration change results (the results of changing the configuration of the MEP) to the network monitoring server 1 (S320). Upon receiving the MEP configuration change results from the switches 201 to 224, the network monitoring server 1 provides the results to the network manager (S321). Thereafter, the network manager notifies the server manager of the MEP configuration change results provided by the network monitoring server 1 (S322).

Figure 4:
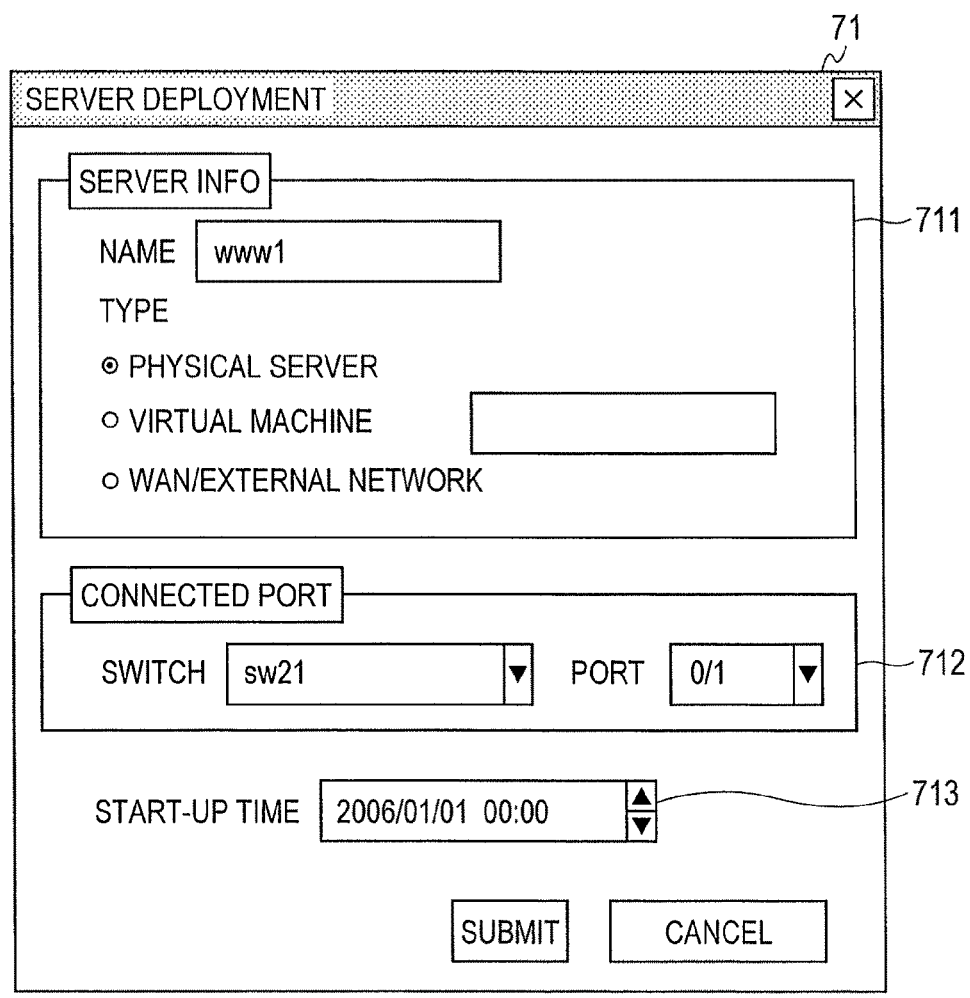
FIG. 4 is a diagram illustrating an example of a server migration information input GUI displayed by the network monitoring server in Step S302 of FIG. 3.

FIG. 4 is a diagram illustrating an example of a server migration information input graphical user interface (GUI) 71 displayed by the network monitoring server 1 in S302 of FIG. 3. The server migration information input GUI 71 is a GUI for allowing the server connection information input program 111 of the network monitoring server 1 to accept an input of the server migration information from the network manager.

The server migration information input GUI 71 includes a connected server area 711 for inputting information on a server to be newly connected, a destination area 712 for inputting information on destination, and a text box 713 for inputting date and time (start-up time) when the physical server will be connected or has already been connected.

In the connected server area 711 are displayed a text box for inputting a name of the server to be newly connected, a radio button for designating the type of server from three servers including the physical server, the virtual machine, and the WAN/external network, and a text box for inputting a name of the physical server of a host server that operates the virtual machine when the virtual machine is designated as the type of server.

In the destination area 712 are displayed two pull-down boxes for selecting a connected switch and a connected port with the server. The respective two pull-down boxes can display all of the switches within the network, and all of the ports provided to the switch selected by the pull-down box that displays the switch.

FIG. 4 illustrates an example in which the physical server of a name "www1" is connected to a port 0/1 of the switch 221 with an identifier of "sw21" at a time point of 2006/01/01.

The server connection information input program 111 of the network monitoring server 1 updates the device deployment information 121, the server migration information 122, or the virtual machine migration information 123 on the basis of the information input by the server migration information input GUI (S303 in FIG. 3).

Figure 5:
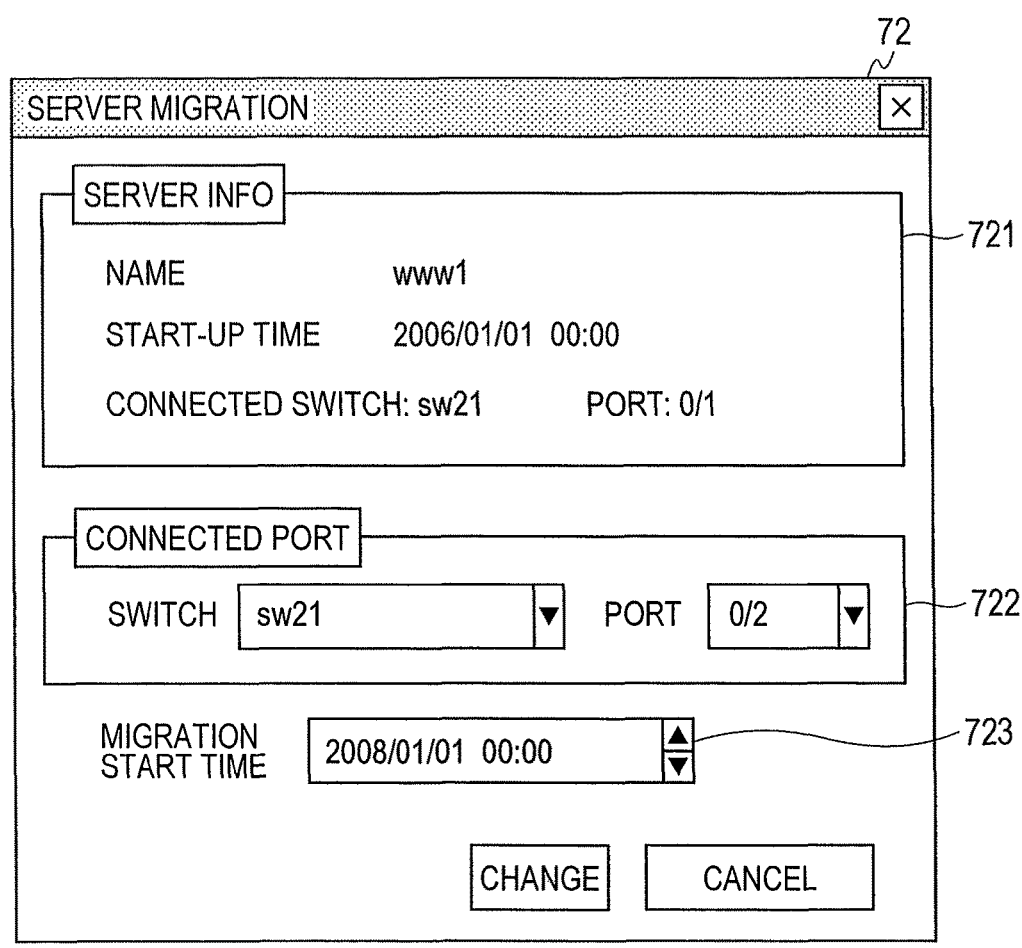
FIG. 5 is a diagram illustrating an example of a physical server migration information input GUI displayed by the network monitoring server in Step S305 of FIG. 3.

FIG. 5 is a diagram illustrating an example of a physical server migration information input GUI 72 displayed by the network monitoring server 1 in Step S305 of FIG. 3. The physical server migration information input GUI 72 is a GUI for allowing the server connection information input program 111 of the network monitoring server 1 to accept an input of the server migration information from the network manager.

The physical server migration information input GUI 72 includes a connected server area 721 for displaying information on the physical server that changes the destination, a connected port area 722 for inputting information on the connected port (destination that has been changed), and a text box 723 for inputting date and time (migration start time) when the destination of the physical server will be changed in the future or has been already changed.

In the connected server area 721 are displayed the name of a physical server whose destination is changed, date and time when the physical server has started to operate, and identifiers of the connected switch and the connected port before the destination is changed.

In the connected port area 722 are displayed two pull-down boxes for selecting the respective connected switch and connected port after changed. In the respective two pull-down boxes, all of the switches within the network, and all of the ports of the switch selected by the pull-down box that displays the switch are selectively displayed.

FIG. 5 illustrates an example in which the physical server of the name "www1" migrates from the port 0/1 of the switch 221 of the identifier "sw21" to a port 0/2 at a time point of 2008/01/01.

The server connection information input program 111 of the network monitoring server 1 updates the server migration information 122 on the basis of information input by the physical server migration information input GUI 72 (S306 in FIG. 3).

Figure 6:
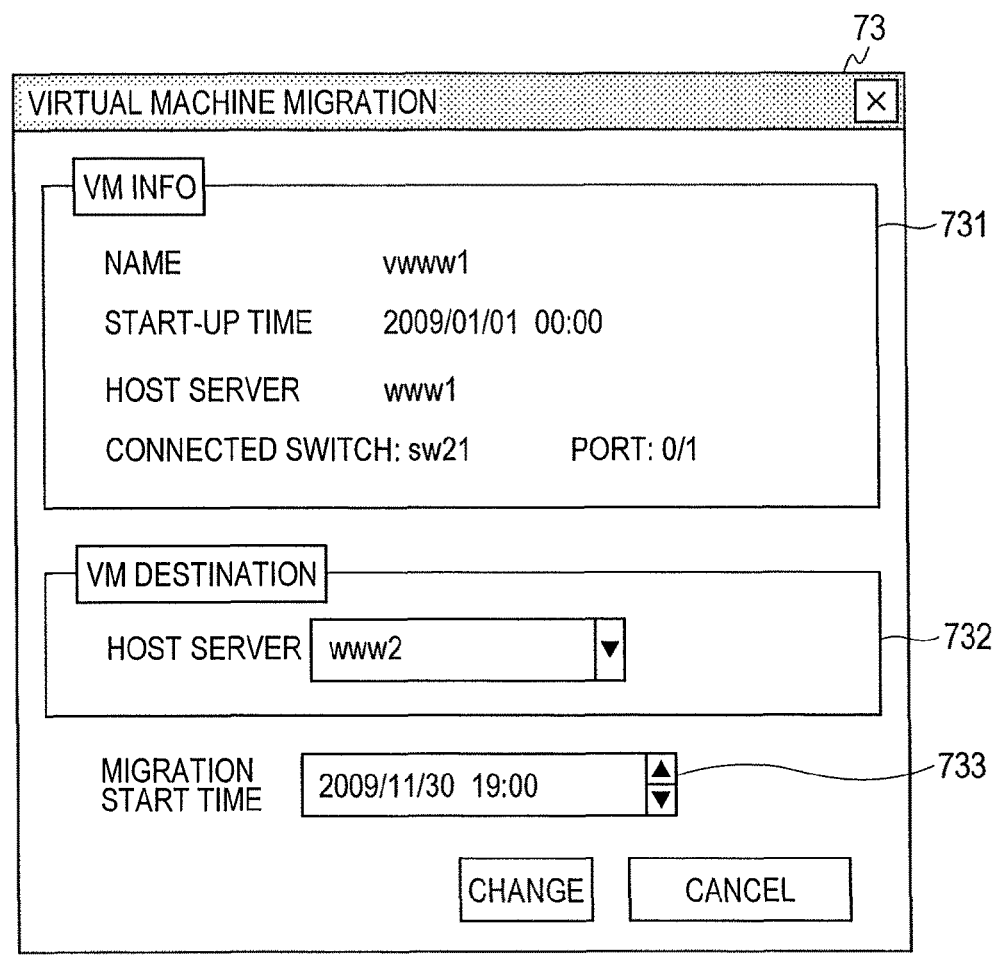
FIG. 6 is a diagram illustrating an example of a virtual machine migration information input GUI displayed by the network monitoring server in Step S308 of FIG. 3.

FIG. 6 is a diagram illustrating an example of a virtual machine migration information input GUI 73 displayed by the network monitoring server 1 in Step S308 of FIG. 3. The virtual machine migration information input GUI 73 is GUI for accepting an input of the virtual machine connection update information from the network manager by the server connection information input program 111 of the network monitoring server 1.

The virtual machine migration information input GUI 73 includes a virtual machine information area 731 for displaying information on the virtual machine that changes an operating host server, a virtual machine destination area 732 for inputting a migrated host server (operating host server after changed), and a test box 733 for inputting date and time (migration start time) when the operating host server of the virtual machine will be changed or has been already changed.

In the virtual machine information area 731 are displayed a name of the virtual machine that changes the operating host server, date and time when the virtual machine has started to operate, a name of the original operating host server of the virtual machine, and the identifiers of a switch and a port which are connected with the original operating host server of the virtual machine.

In the virtual machine destination area 732 s displayed a pull-down box for selecting the operating host server after changed. In the pull-down box is selectively displayed a list of the physical servers within the network which can operate the virtual machine.

FIG. 6 illustrates an example in which the virtual machine "vwww1" that operates on the physical server "www1" connected to the port 0/1 of the switch whose identifier is "sw21" migrates on the physical server "www2".

The server connection information input program 111 of the network monitoring server 1 updates the virtual machine migration information 123 on the basis of information input by the virtual machine migration information input GUI 73 (S309 in FIG. 3).

Figure 7:
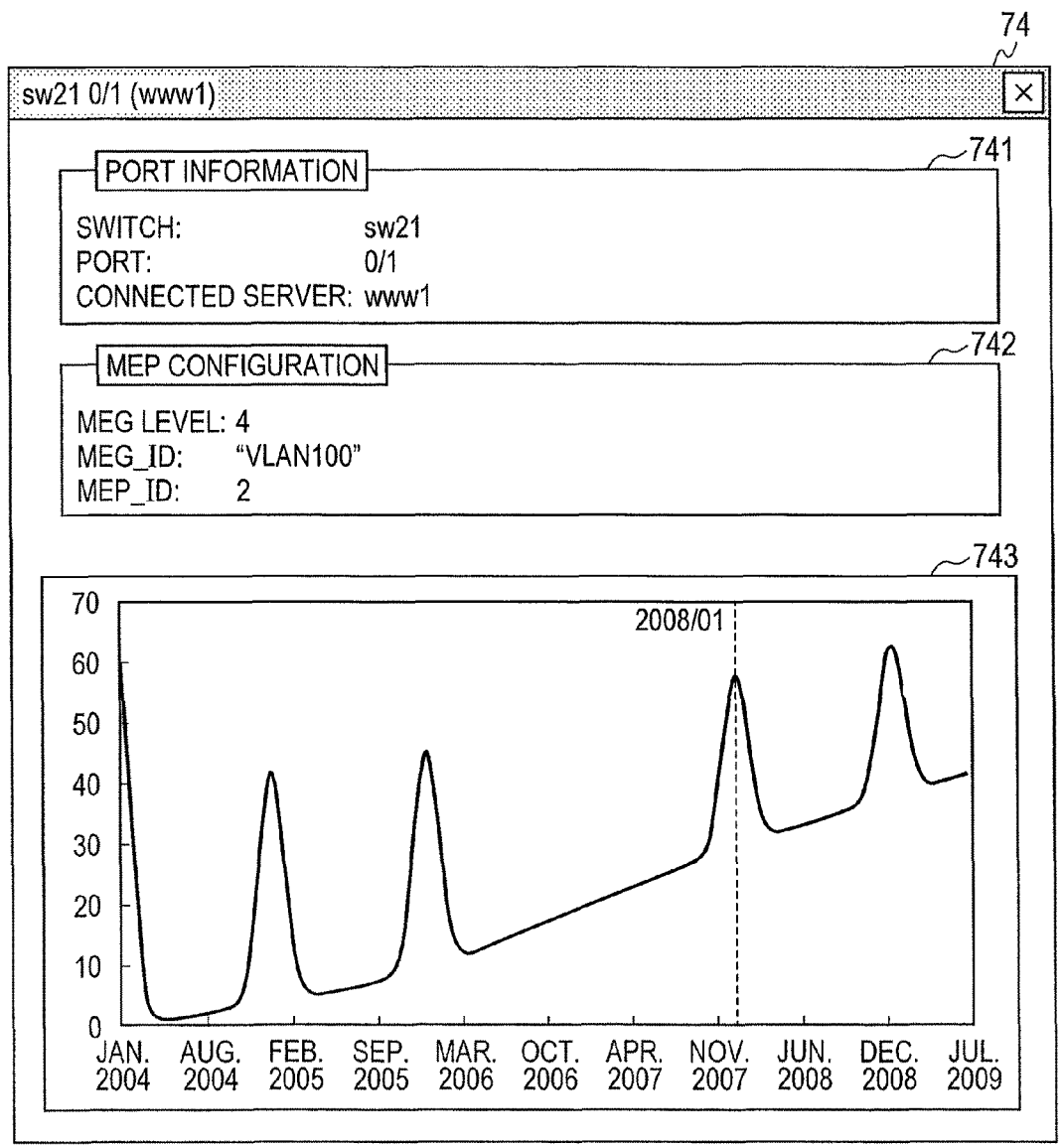
FIG. 7 is a diagram illustrating an example of a port monitoring priority display GUI displayed by the network monitoring server in Step S312 of FIG. 3.

FIG. 7 is a diagram illustrating an example of a port monitoring priority display GUI 74 displayed by the network monitoring server 1 in Step S312 of FIG. 3. The port monitoring priority display GUI 74 is displayed when the network monitoring server 1 receives a request for selecting the MEP-assigned port from the network manager. The port monitoring priority display GUI 74 displays the information on the monitoring priority for each of the ports.

The port monitoring priority display GUI 74 includes a port information area 741 for displaying information on a port to be displayed, an MEP configuration area 742 for displaying information on an MEP assigned to the port to be displayed, and a graph area 743 for displaying a graph of a change in the port monitoring priority calculated for the port to be displayed with time (time change).

In the port monitoring priority display GUI 74 are displayed an identifier of a switch having the port to be displayed, an identifier of a port to be displayed, and an identifier of a server connected to the port to be displayed.

In the MEP configuration area 742 are displayed a level of a maintenance entity group (MEG) corresponding to the MEP assigned to the port to be displayed, an identifier of the MEG, and an identifier of the MEP. When no MEP is assigned to the port to be displayed, no information is displayed in the MEP configuration area 742.

In the graph area 743 is displayed a graph showing a time on the axis of abscissa and a change in the port monitoring priority with time on the axis of ordinate. The network manager can grasp from this graph at which time point the port to be displayed should be preferentially monitored.

In the graph area 743 of FIG. 7 is displayed a graph showing an example of a change in the monitoring priority of the port 0/1 of the switch "sw21" connected with the server "www1", with time. The graph shows the change in the monitoring priority of the port when the switch "sw21" is newly introduced in January of 2004, the configuration of the switch "sw21" is changed in January of 2005, the physical server is newly connected in January of 2006, and the virtual machine is added in January of 2008 and January of 2009.

The port monitoring priority on the axis of ordinate gently increases from January of 2004. The gentle increase arises from an degradation failure rate (an increase in the failure rate caused by the advanced degradation of parts with time) of the switch "sw21" that has been introduced in January of 2004. Also, the degree of the increase is slightly enhanced from January of 2006. This increase arises from the degradation failure rate of the server that has been connected in January of 2006. Further, the port monitoring priority temporarily increases around January of 2005, January of 2006, January of 2008, and January of 2009. This arises from a change in the configuration of the switch, the physical server, the virtual machine, and so on at each time point.

In the network monitoring server 1 according to the first embodiment of the present invention, as shown in the graph area 743, as time elapses after a switch (or a server) has been introduced into the network, the monitoring priority of the port is calculated so as to enhance monitoring of a port of that switch (a port connected to the server).

Also, when the destination of the server has been changed, the monitoring priority of the port is temporarily enhanced. This is to reflect that there is an error in configuration of the server and the network for changing the destination of the server, and a failure is liable to occur in a service provided by the system.

Also, when the configuration change such as addition/exchange of a switch on the network path used by the server has been executed, the monitoring, priority of the port connected to the server using the network path including that switch is enhanced. This is to reflect that as in a case where the destination of the server has been changed, there is an error in configuration of a switch for adding and exchanging the switch, and a failure is liable to occur in the network connection.

In this way, the network monitoring server 1 calculates the monitoring priority that reflects plural factors for each of the ports, and displays the calculated monitoring priority, whereby the network manager can prioritize plural ports within the network.

In order to achieve this, the network monitoring server 1 calculates the failure rate for each port of the switches within the network, and calculates the monitoring priority on the basis of the calculated failure rate (a calculating method will be described later with reference to FIG. 14). The failure rate is obtained according to the server degradation failure rate Ewear (t) that increases more as an accumulative operating time of the server connected to the port is longer, or a change-related failure rate Fchg (t) that takes a certain value of 0 or more until an elapsed time from the port connection time point of the server connected to the port, or an elapsed time from a time of the virtual machine creation and migration reaches a preset value. Thereafter, the network monitoring server 1 displays a list of the ports in the descending order of the monitoring priority, and provides, to the network manager, which port the MEP should be assigned to.

Figure 8:
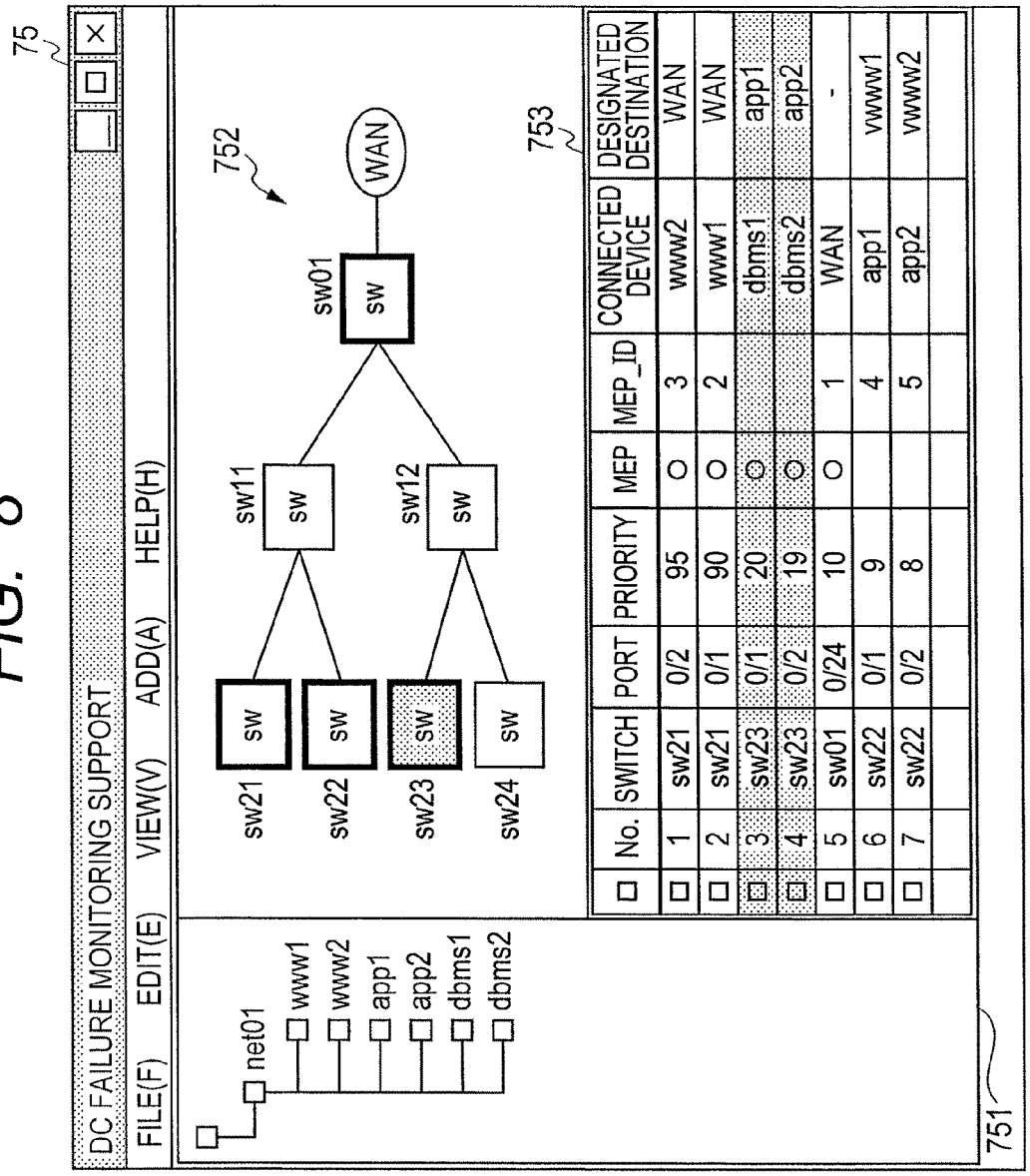
FIG. 8 is a diagram illustrating an example of an MEP-assigned port confirmation GUI displayed by the network monitoring server in Step S313 of FIG. 3.

FIG. 8 is a diagram illustrating an example of an MEP-assigned port confirmation GUI 75 displayed by the network monitoring server 1 in Step S313 of FIG. 3. The MEP-assigned port confirmation GUI 75 is displayed when the network monitoring server 1 receives a request for selecting the MEP-assigned port from the network manager.

The MEP-assigned port confirmation GUI 75 includes a server list display area 751 (window left side) for displaying a list of the respective servers provided in the network in a tree shape, a network display area 752 (window right upper side) for displaying the respective switches provided in the network, and a port information display area 753 (window right lower side) for displaying information on configuration of the MEP for each port (for example, monitoring priority of each port).

In the network display area 752 is displayed a network structure that allows the link state between the respective switches to be grasped by combination of icons and straight lines. Also, in the network display area 752 are thickly displayed frame borders of the icons corresponding to the switches including the MEP-assigned ports. In this way, the switches including the MEP-assigned ports are emphatically displayed with the results that the network manager can visually determine which switch the MEP should be assigned to among the large number of switches within the network.

In the port information display area 753 is displayed information on assignment of the MEP for each port in a tabular form. Each entry of this table includes a unique identification number (No.) within the network, an identifier (switch) of a switch to which a port belongs, an identifier (port) of the port, the monitoring priority (priority) calculated for each port, a flag (MEP configuration) indicating that the port has been selected as the MEP-assigned port, an identifier (MEP_ID) of the MEP assigned to the port, an identifier (connected device) of a device connected to the port, and a typical destination identifier (typical destination) of the device connected to the port.

FIG. 8 illustrates an example in which the switch "sw01" is connected to the WAN, the respective switches "sw21", "sw22", and "sw23" are connected to two servers, and the number of assignable MEPs within the network is limited to 5 at a maximum. FIG. 8 also illustrates a case in which among 7 ports that are displayed in the table of the port information display area 753, the port 0/2 of the switch "sw21" highest in the monitoring priority to a port 0/24 of the switch "sw01" whose port monitoring priority has been calculated as 10 are set as the MEP-assigned ports.

Through the MEP-assigned port confirmation GUI 75, the network manager can easily grasp which port should be selected as the MEP-assigned port so as not to exceed the maximum number of assignable MEPs. As a result, the MEP can be assigned to the ports of the number as large as possible while suppressing the control load on each switch.

Also, in FIG. 8, the entries of the ports which have been selected as the MEP-assigned ports, and to which the MEP_ID has not been allocated at that time point are displayed distinctively from the other entries. For example, a display color of the entries corresponding to the port 0/1 and the port 0/2 of the switch "sw23" is different from that of the other entries. As a result, the network manager can easily grasp which port is deficient in assignment of the MEP.

Figures 9, 10:
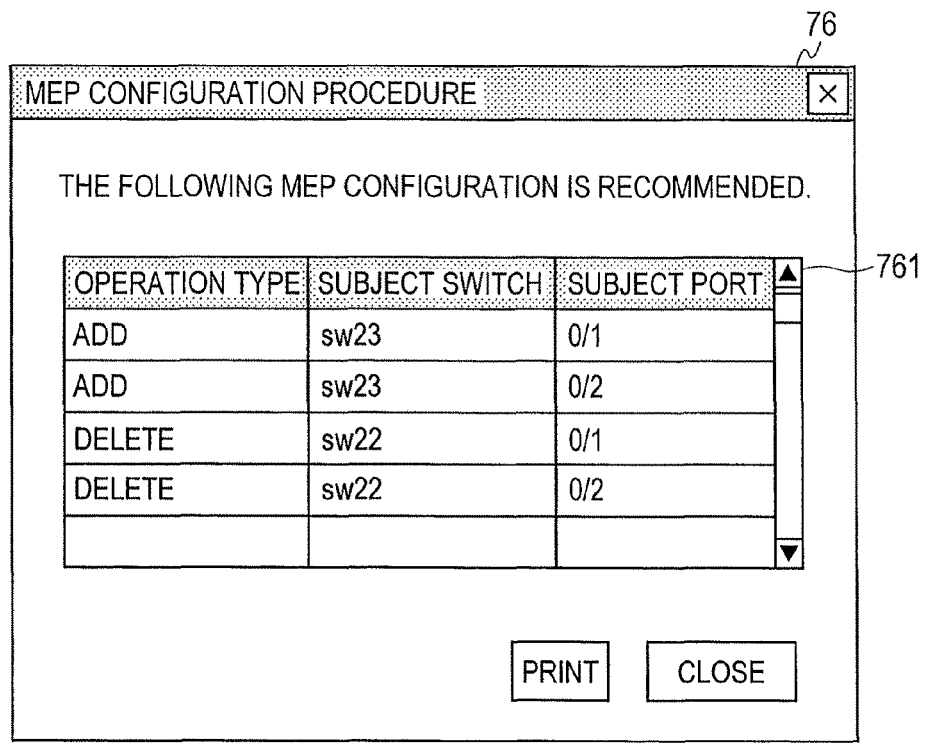
FIG. 9 is a diagram illustrating an example of an MEP configuration procedure display GUI displayed by the network monitoring server in Step S317 of FIG. 3.
FIG. 10 is a table showing a configuration example of MEP configuration according to the first embodiment of the present invention.

FIG. 9 is a diagram illustrating an example of an MEP configuration procedure display GUI 76 displayed by the network monitoring server 1 in S317 of FIG. 3. The MEP configuration procedure display GUI 76 is displayed when the network monitoring server 1 receives a request for generation of the MEP configuration procedure from the network manager.

The MEP configuration procedure display GUI 76 includes an MEP configuration change instruction table 761 that instructs the network manager about a port to be changed in assignment of the MEP.

Each entry of the MEP configuration change instruction table 761 includes a character string (operation type) of the operation type of the MEP configuration to be recommended, an identifier (target switch) of a switch to which the MEP is to be assigned, and an identifier (target port) of a port to which the MEP is to be assigned. In the operation type, any one of "addition" and "deletion" is stored.

FIG. 9 illustrates an instruction for newly adding the port 0/1 and the port 0/2 of the switch "sw23" to the MEP-assigned port, and an instruction for deleting the port 0/1 and the port 0/2 of the switch "sw22" from the existing MEP-assigned ports. Each entry of the MEP configuration change instruction table 761 is generated by comparing the assembly of the ports that have been selected to the ports to which the MEP is to be assigned shown in the MEP-assigned port confirmation GUI 75 of FIG. 8 with the assembly of the ports which are the MEP-assigned ports at this time to obtain a difference therebetween, by the network monitoring server 1.

Through the MEP configuration change instruction table 761, the network manager can easily grasp only the entries to be changed in the existing MEP configuration. As a result, the network manager can change the MEP-assigned port promptly in time for a change in the system configuration.

FIG. 10 is a table showing a configuration example of MEP configuration 142 according to the first embodiment of the present invention. The MEP configuration 142 manages information on assignment of the MEP for each port. The MEP configuration 142 is data of a tabular form.

Each entry of the MEP configuration 142 includes an identifier (switch) of an MEP assignment target switch, an identifier (port) of an MEP assignment target port, an MEP assignment direction (direction), the number of levels (MEG level) of the MEG corresponding to the MEP, an ID character string (MEG_ID) of the MEG corresponding to the MEP, and an identifier (MEP_ID) of the MEP.

The network monitoring server 1 updates the MEP configuration 142 on the basis of the MEP configuration contents or the MEP configuration change contents, which has been acquired from the respective switches 201 to 224 through the configuration I/F of the switches. The MEP configuration 142 illustrated in FIG. 10 corresponds to the MEP configuration contents displayed in the port information display area 753 of FIG. 8. That is, the MEP is assigned to the port 0/24 of the switch "sw01", the port 0/1 and the port 0/2 of the switch "sw21", and the port 0/1 and the port 0/2 of the switch "sw22". To the respective MEP-assigned ports are allocated MEP_ID in the order of from 1 to 5.

FIG. 11 is a table showing a configuration example of device deployment information 121 according to the first embodiment of the present invention. The device deployment information 121 stores information on the deployment of a device (switch, server, virtual machine). The device deployment information 121 is data of a tabular form.

Each entry of the device deployment information 121 includes a character string (device name) of a device name, an identifier (device type) representing a device type, and date and time (deployment date and time) when the device has been introduced. In the device type, any one of the switch, the server, and the virtual machine is designated.

The server connection information input program 111 of the network monitoring server 1 updates the device deployment information 121. In this situation, when the device type is the server, the server connection information input program 111 updates the device deployment information 121 together with the server migration information 122. Also, when the device type is the virtual machine, the server connection information input program 111 updates the device deployment information 121 together with the virtual machine migration information 123.

FIG. 11 shows an example in which the operation of three switches "sw01", "sw11", and "sw12" starts in January of 2004, the operation of two switches "sw21" and "sw22" starts in January of 2005, the operation of two switches "sw23" and "sw24", and one server "www1" starts in January of 2006, the operation of one server "app1" starts in January of 2007, and the operation of one virtual machine "vwww1" starts in January of 2009.

FIG. 12 is a table showing a configuration example of server migration information 122 according to the first embodiment of the present invention. The server migration information 122 stores information on a change in the destination of the server. The server migration information 122 is data of a tabular form.

Each of the server migration information 122 includes date and time (date and time) when the migration of a server has been executed, an identifier (server ID) of the server, an identifier (operation type) representative of the operation type, an identifier (connected switch) of a connected switch after the destination has been changed, an identifier (connected port) of a connected port after the destination has been changed, an identifier (source switch) of the connected switch before the destination is changed, an identifier (source port) of the connected port before the destination is changed, and a designated destination (designated destination) of the server.

In the operation type, any one of "addition" and "migration" is stored. In the case of a server newly connected, the original switch and the original port are blank. The server connection information input program 111 of the network monitoring server 1 updates the server migration information 122.

FIG. 12 shows an example in which the server "www1" is connected to the port 0/1 of the switch "sw21" with "WAN" as the designated destination in January of 2006, the server "app1" is connected to the port 0/1 of the switch "sw22" with the server "www1" as the designated destination in January of 2007, and the destination of the server "www1" changes from the port 0/1 of the switch "sw21" to the port 0/2 of the same switch "s21".

FIG. 13 is a table showing a configuration example of virtual machine migration information 123 according to the first embodiment of the present invention. The virtual machine migration information 123 stores information on the addition or migration of the virtual machine. The virtual machine migration information 123 is data of a tabular form.

Each entry of the virtual machine migration information 123 (date and time) includes date and time when the virtual machine has been added or migrated, an identifier (server ID) of a server, an identifier (operation type) representative of the operation type, an identifier (operating host server) of a physical server that operates the virtual machine, a network I/F (use port) used for connection to the network of the virtual machine among the network I/Fs of the physical server, an identifier (source host server) of the physical server in which the virtual machine has operated before the virtual machine migrates, and an identifier (use port) of a port of the physical server in which the virtual machine has operated before the virtual machine migrates. The server connection information input program 111 of the network monitoring server 1 updates the virtual machine migration information 123.

FIG. 13 shows an example in which the virtual machine "vwww1" is newly added to the network in January of 2009, operates on the server "www1", and is connected to an external network by using a network I/F "eth0" of the server "www1".

Figure 14:
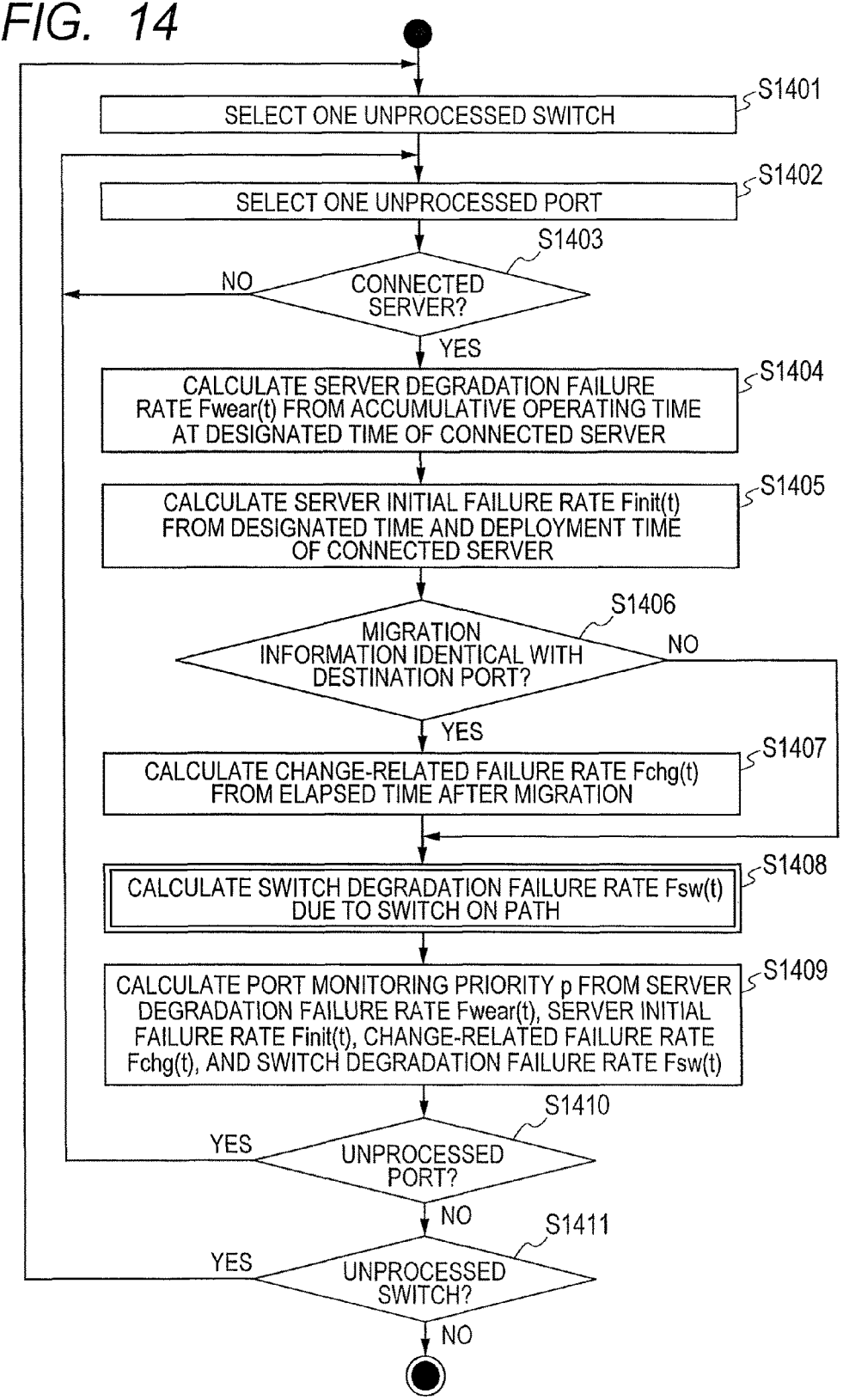
FIG. 14 is a flowchart showing a control logic of a port monitoring priority calculation program of the network monitoring server according to the first embodiment of the present invention.

FIG. 14 is a flowchart showing a control logic of a port monitoring priority calculation program 131 of the network monitoring server 1 according to the first embodiment of the present invention. A control logic for calculating the monitoring priority for each port by the port monitoring priority calculation program 131 will be described.

The port monitoring priority calculation program 131 first selects one unprocessed switch from switches within the network (S1401). The port monitoring priority calculation program 131 then selects one unprocessed port from ports of the selected switch (S1402). Thereafter, the port monitoring priority calculation program 131 retrieves an entry corresponding to the selected port from the server migration information 122, and checks whether a server connected to this port exists, or not (S1403).

When no connected server exists (no in S1403), processing returns to S1402, and the port monitoring priority calculation program 131 selects one subsequent unprocessed port, and repeats the same processing. On the other hand, when the connected server exists (yes in S1403), the port monitoring priority calculation program 131 retrieves the entry corresponding to the connected server from the device deployment information 121, and acquires deployment date and time t1 of the connected server. Thereafter, the port monitoring priority calculation program 131 obtains an accumulative operating time t−t1 of the server at a designated time t on the basis of the acquired deployment date and time t1, and calculates a server degradation failure rate Fwear(t) on the basis of the obtained accumulative operating time t−t1 (S1404). The server degradation failure rate Fwear(t) is a failure rate at which the degradation of the server (components thereof) is advanced with time. The server degradation failure rate Fwear(t) is calculated through, for example, the following calculation Expressions (1) and (2) of exponential distribution.

$$F\text{wear}(t)=1-\exp(-\lambda(t-t1))(t \geq t1) \quad (1)$$

$$F\text{wear}(t)=0 (t<t1) \quad (2)$$

In Expressions (1) and (2), t1 is the deployment date and time of the server. Symbol λ is a parameter representative of a degradation speed determined for each type of the server. Expressions (1) and (2) show a condition in which as the accumulative operating time t−t1 of the server increases more, the degradation of the components that configure the server is advanced more to elevate the failure rate of the server.

Thereafter, the port monitoring priority calculation program 131 calculates a server initial failure rate Finit(t) on the basis of the designated time t and the deployment date and time t1 of the connected server (S1405). The server initial failure rate Finit(t) is an initial failure rate due to deployment of the server, and becomes highest when the server has been introduced. The server initial failure rate Finit(t) is calculated through Expression (3) based on a normal distribution centered on, for example, t=t1.

$$F\text{init}(t)=1/(\sqrt{2\pi})[\exp(-(t-t1)^2/(2\sigma^2))] \quad (3)$$

In Expression (3), σ is a parameter representative of a stabilization speed of the system accompanied by the server connection. In Expression (3), a given period of time after the destination of the server has been changed, or the virtual machine has been added to the server shows a condition in which a failure is liable to occur in the server provided by the system due to a configuration error or an operation error.

Thereafter, the port monitoring priority calculation program 131 investigates, from the server migration information 122, whether there are entries in which the selected port is the destination, and the migration date and time is before the designated time t, or not (S1406). When there are appropriate entries (yes in S1406), the port monitoring priority calculation program 131 calculates, for each of the appropriate entries, the change-related failure rate Fchg(t) on the basis of an elapsed time since the server has been connected to the entry (S1407). The change-related failure rate Fchg(t) is a failure rate obtained by combining the failure rates arising from all the migrations of the server together. The change-related failure rate Fchg(t) is calculated through Expression (4) in which the failure rates arising from the respective migrations of the server are calculated on the basis of the normal distribution centered on, for example, t=tm (m=0, 1, 2, . . . ), and a product sum of probabilities obtained by subtracting the respective failure rates from 1 is further subtracted from 1.

$$Fchg(t)=1-\Pi[1-1/(\sqrt{2\pi})[\exp(-(t-tm)^2/(2\sigma^2))]]$$
$$(m=0,1,2,\dots) \quad (4)$$

On the other hand, when there is no appropriate entry (no in S1406), the port monitoring priority calculation program 131 proceeds to S1408 not through S1407.

Thereafter, the port monitoring priority calculation program 131 acquires the designated destination of the server from the server migration information 122, and calculates a switch degradation failure rate Fsw(t) on the basis of the accumulative operating time of the switches located on a path between the server and the designated destination (S1408). The switch degradation failure rate Fsw(t) is a failure rate at which the degradation of the switch (components thereof) is advanced with time. The detail of S1408 will be described later with reference to FIG. 15. The switch degradation failure rate Fsw(t) is calculated through, for example, the following Expression (5).

$$Fsw(t)=1-\Pi[1-Fswn(t)](n=0,1,2,\dots) \quad (5)$$

where Fswn(t) is the failure rate of an n-th switch single body existing on the path between the server and the designated destination. Fswn(t) is calculated by, for example, the following Expression (6).

$$Fswn(t)=1-\exp(-\lambda(t-tn))(n=0,1,2,\dots) \quad (6)$$

In Expression (6), tn (n=0, 1, 2, . . . ) is the deployment date and time of the n-th switch. Expression (6) shows a condition in which as the accumulative operating time of the switch increases more, the degradation of the components that configure the switch is advanced more to elevate the failure rate of the switch.

Thereafter, the port monitoring priority calculation program 131 calculates a monitoring priority p of the ports on the basis of the server degradation failure rate Fwear(t), the server initial failure rate Finit(t), the server change-related failure rate Fchg(t), and the switch degradation failure rate Fsw(t) (S1409). The port monitoring priority p is calculated by, for example, the following Expression (7).

$$p=100[1-(1-Fwear(t))(1-Finit(t))(1-Fchg(t))(1-Fsw(t))] \quad (7)$$

Thereafter, the port monitoring priority calculation program 131 investigates whether there is an unprocessed port, or not (S1410). When there is the unprocessed port (yes in S1410), processing returns to S1402, and the port monitoring priority calculation program 131 one subsequent unprocessed port, and repeats a sequence of processing. On the other hand, when there is no unprocessed port (no in S1410), the port monitoring priority calculation program 131 investigates whether there is an unprocessed switch, or not (S1411). When there is the unprocessed switch (yes in S1411), processing returns to S1401, and the port monitoring priority calculation program 131 selects one subsequent unprocessed switch, and repeats a sequence of processing. On the other hand, when there is no unprocessed switch (no in S1411), the port monitoring priority calculation program 131 terminates the processing.

Figure 15:
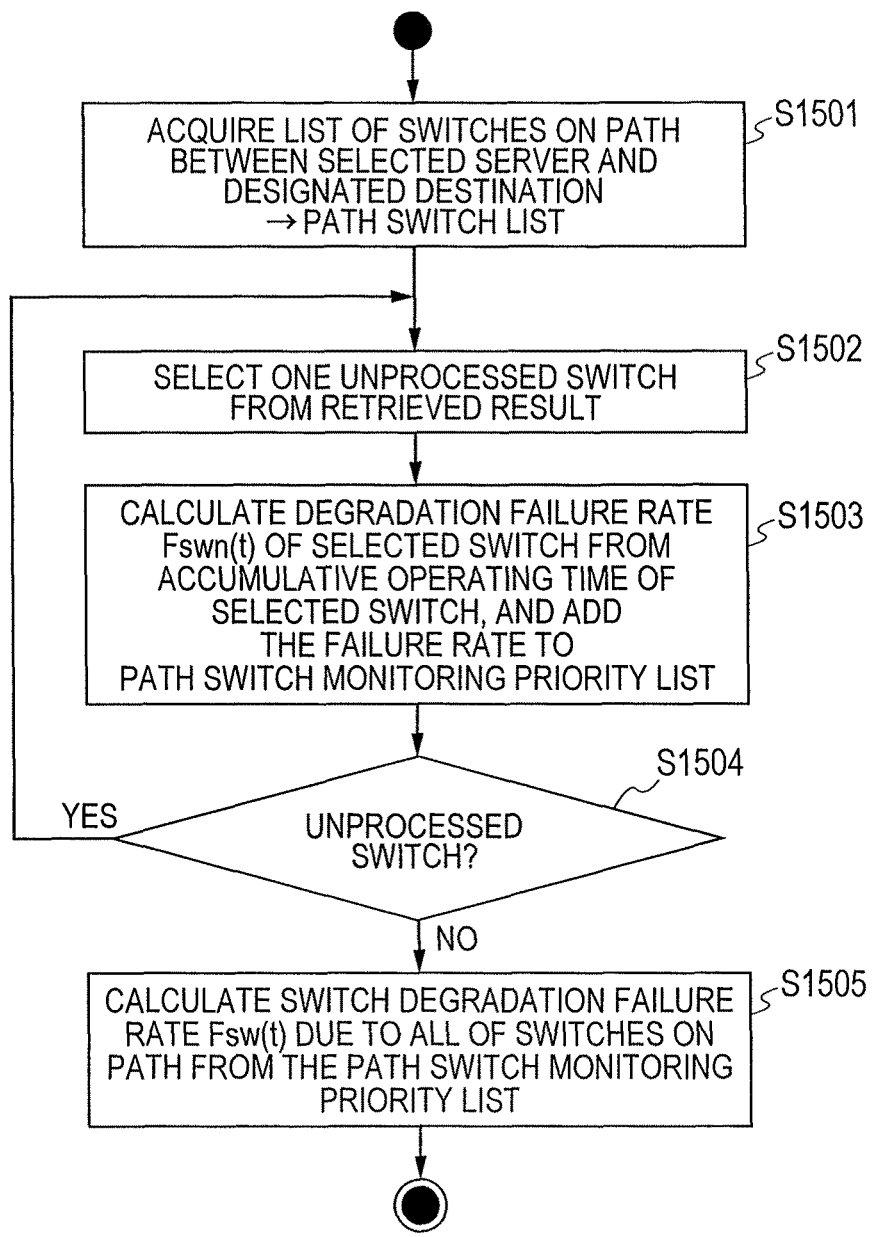
FIG. 15 is a flowchart showing an example of calculating a switch degradation failure rate Fsw(t) in the port monitoring priority calculation program of the network monitoring server according to the first embodiment of the present invention.

FIG. 15 is a flowchart showing an example of calculating the switch degradation failure rate Fsw(t) in the port monitoring priority calculation program 131 of the network monitoring server 1 according to the first embodiment of the present invention. Processing of S1408 in FIG. 14 will be described in detail.

The port monitoring priority calculation program 131 first creates a list of the switches existing on the path between the connected server and the designated destination on the basis of the network connection information 124, and retains the created list as a path switch list (S1501). The port monitoring priority calculation program 131 then selects one unprocessed switch from the path switch list (S1502). In this example, the port monitoring priority calculation program 131 selects the switches in the order from a head of the path switch list.

Thereafter, the port monitoring priority calculation program 131 calculates the degradation failure rate Fswn(t) of the selected switch, and adds the calculated degradation failure rate Fswn(t) to the path switch monitoring priority list (S1503). More specifically, the port monitoring priority calculation program 131 acquires the deployment date and time of the selected switch from the device deployment information 121, and calculates the accumulative operating time of the switch. Then, the port monitoring priority calculation program 131 calculates the degradation failure rate Fswn(t) of the switch single body on the basis of the calculated accumulative operating time. Thereafter, the port monitoring priority calculation program 131 creates a list of the degradation failure rate Fswn(t) of each switch, and retains the created list as a path switch monitoring priority list.

Thereafter, the port monitoring priority calculation program 131 investigates whether there is the unprocessed switch in the path switch list, or not (S1504). When there is the unprocessed switch (yes in S1504), the port monitoring priority calculation program 131 selects one unprocessed switch from the path switch list, and repeats a sequence of processing. On the other hand, when there is no unprocessed switch (no in S1504), the port monitoring priority calculation program 131 calculates the failure rate Fsw(t) of the entire switches on the path on the basis of the components of the path switch monitoring priority list, that is, the degradation failure rate Fswn(t) of the switch single body of each switch (S1505).

Figures 16, 17:
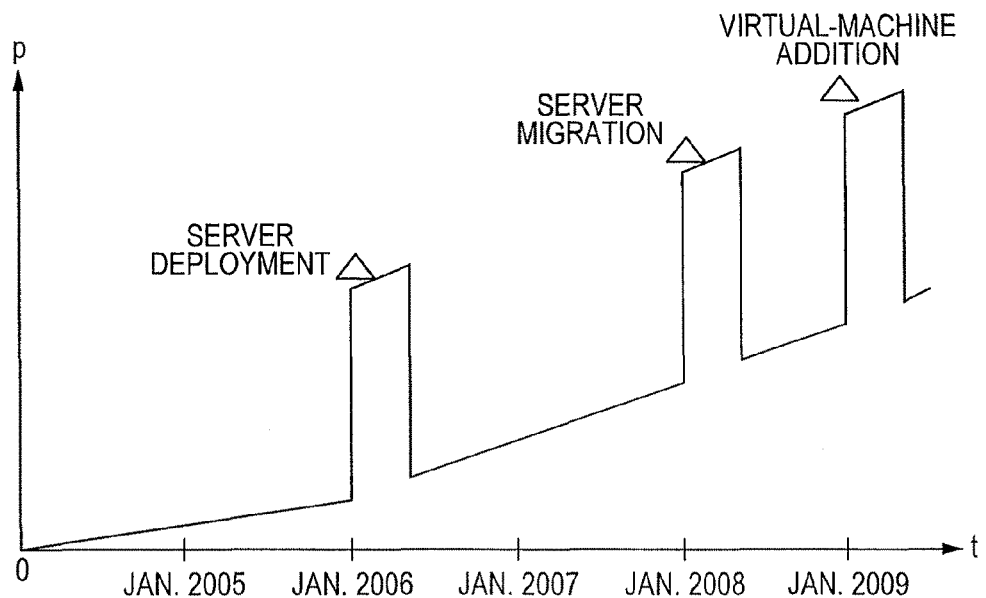
FIG. 16 is a table showing a configuration example of port monitoring priority information according to the first embodiment of the present invention.
FIG. 17 is a graph showing an example of the port monitoring priority calculated on the basis of the control logic illustrated in FIG. 14.

FIG. 16 is a table showing a configuration example of the port monitoring priority information 141 according to the first embodiment of the present invention. The port monitoring priority information 141 stores information on the monitoring priority of each port. The port monitoring priority information 141 is data of a tabular form. Each entry of the port monitoring priority information 141 is created for each port whose port monitoring priority is calculated.

Each entry of the port monitoring priority information 141 includes an identifier (switch) of a switch having a port, an identifier (port) of the port, an identifier (connected device) of a device connected to the switch, a value (monitoring priority) of the calculated monitoring priority, a switch degradation failure rate Fsw(t) (switch degradation failure rate) used to calculate the monitoring priority, a server degradation failure rate Fwear(t) (server degradation failure rate), a server initial failure rate Finit(t) (server initial failure rate), and a server change-related failure rate Fchg(t) (server change-related failure rate).

The port monitoring priority calculation program 131 of the network monitoring server 1 stores a progress in calculating the monitoring priority of the port, and the calculated results in the port monitoring priority information 141.

FIG. 16 shows an example in which the port monitor priorities in January of 2009 have been calculated for the port 0/2 of the switch "sw21" and the port 0/1 of the switch "sw22". The port 0/2 of the switch "sw21" is connected with the server "www1", and the port 0/1 of the switch "sw22" is connected with the server "app1".

In this example, it is assumed that the server "www1" has started to operate in January of 2006. Also, it is assumed that the server "www1" changes the connected port from the port 0/1 of the switch "sw21" to the port "0/2" in January of 2008. Further, it is assumed that one virtual machine has been added to the server "www1" in January of 2009. On the other hand, it is assumed that the server "app1" has started to operate in January of 2007.

Under the above assumptions, the monitoring priority of the port 0/2 of the switch "sw21" which is calculated on the basis of the control logic of FIG. 14 is 62.33. Also, the monitoring priority of the port 0/1 of the switch "sw22" is 31.95. A difference between those two monitor priorities is attributed to a fact that the server change-related failure rate of the port 0/2 of the switch "sw21" is 39.34%, that is, large. This is caused by addition of the virtual machine to the server "www1" in January of 2009.

FIG. 17 is a graph showing an example of the port monitoring priority p calculated on the basis of the control logic illustrated in FIG. 14. In this example, it is assumed that the port monitoring priority p is simplified to a sum of the switch degradation failure rate Fsw(t), the server degradation failure rate Fwear(t), the server initial failure rate Finit(t), and the server change-related failure rate Fchg(t).

The switch degradation failure rate Fsw(t) is calculated as a value proportional to the accumulative operating time of the switches on the path between the server connected to the port and the designated destination. Like the switch degradation failure rate Fsw(t), the server degradation failure rate Fwear(t) is calculated as a value proportional to the accumulative operating time of the server connected to the port. The server initial failure rate Finit(t) is held to a given value for a given period of time since the server has started to operate. Like the server initial failure rate Finit(t), the server change-related failure rate Fchg(t) is held to a given value for a given period of time after the destination change of the server and the addition of the virtual machine to the physical server.

When the port monitoring priority p calculated by the sum of those respective failure rates is represented as a graph with a time on the axis of abscissa and the port monitoring priority on the axis of ordinate, the graph shows a time series variation entirely configured by straight lines.

As a result, as illustrated in FIG. 17, (port monitoring priority p)=(switch degradation failure rate Fsw(t)) is satisfied since a time 0 when the switch has been introduced till January of 2006. Also, after the server has been introduced, for example, since January of 2007 till January of 2008, (port monitoring priority p)=(switch degradation failure rate Fsw(t))+(server degradation failure rate Fwear (t)) is satisfied. Also, for a given period of time since January of 2006 when the server has been introduced, (port monitoring priority p)= (switch degradation failure rate Fsw(t))+(server degradation failure rate Fwear(t))+(server initial failure rate Finit (t)) is satisfied. For a given period of time since January of 2006 when the server has migrated and for a given period of time since January of 2009 when the virtual machine has been added, (port monitoring priority p)=(switch degradation failure rate Fsw(t))+(server degradation failure rate Fwear(t))+ (server initial failure rate Finit(t))+(server change-related failure rate Fchg(t)) is satisfied.

Figure 18:
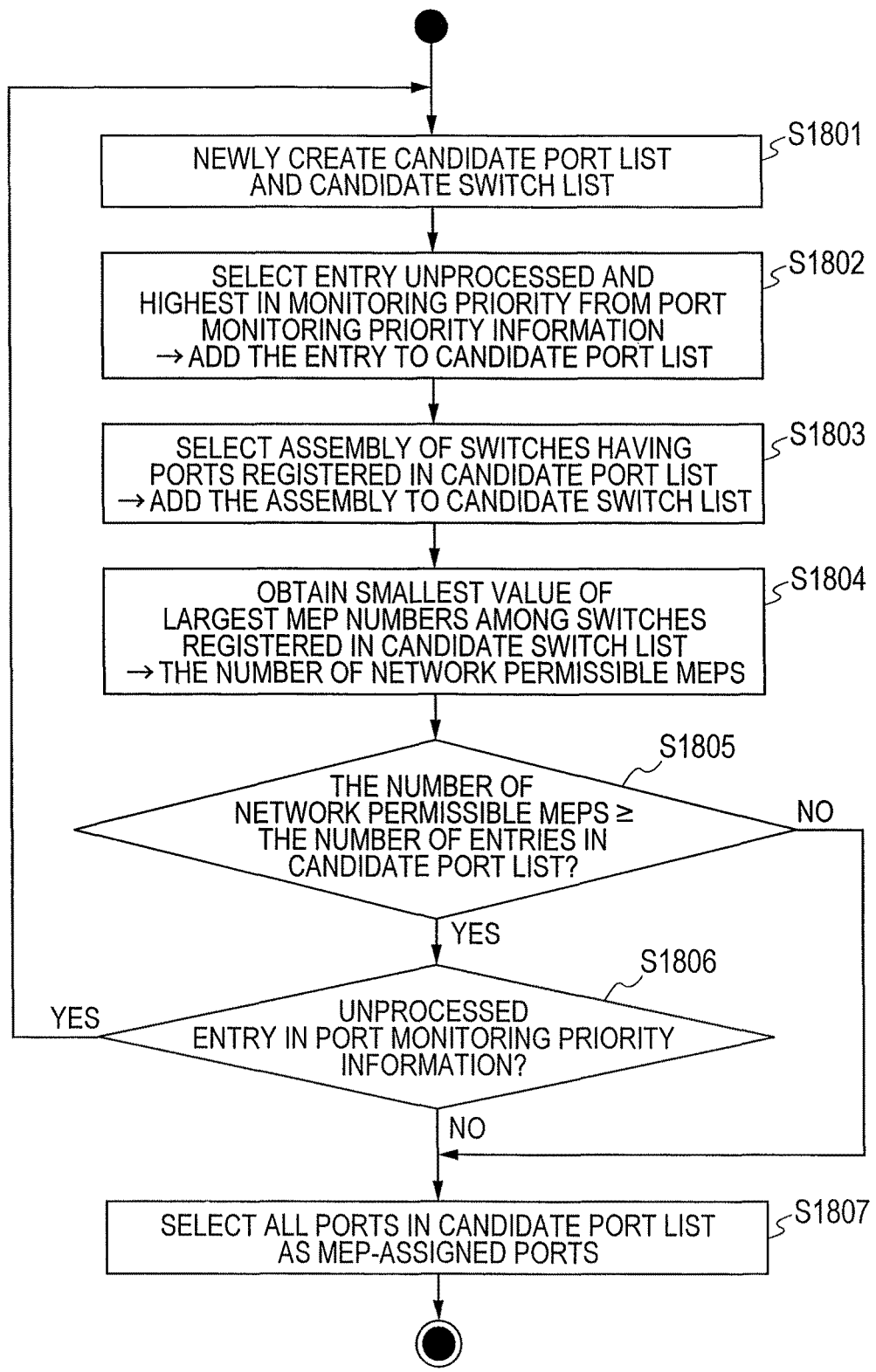
FIG. 18 is a flowchart showing a control logic for selecting the MEP-assigned port by an MEP-assigned port select program of the network monitoring server according to the first embodiment of the present invention.

FIG. 18 is a flowchart showing a control logic for selecting the MEP-assigned port by the MEP-assigned port selection program 132 of the network monitoring server 1 according to the first embodiment of the present invention.

The MEP-assigned port selection program 132 first newly creates a candidate port list and a candidate switch list as a work area used within this processing (S1801). The candidate port list is a list of candidates of the ports to which the MEP is assigned. The candidate switch list is a list of the switches having the ports registered in the candidate port list.

The MEP-assigned port selection program 132 then selects an entry including a port largest in a value of the monitoring priority among the entries that are not subjected to processing of S1803 to 1805, which will be described later, from the port monitoring priority information 141 (S1802). Also, the MEP-assigned port selection program 132 adds the selected port to the candidate port list created in S1801.

Thereafter, the MEP-assigned port selection program 132 selects an assembly of the switches having the ports registered in the candidate port list from all of the switches (S1803). Also, the MEP-assigned port selection program 132 registers the assembly of the selected switches in the initialized candidate switch list created in S1801.

Thereafter, the MEP-assigned port selection program 132 obtains the smallest value among the largest number of MEPs of all the switches registered in the candidate switch list (the largest number of MEPs assignable to the respective switches) (S1804). The smallest value of the largest number of MEPs is called "the number of network permissible MEPs) ".

Thereafter, the MEP-assigned port selection program 132 compares the obtained number of network permissible MEPs with the number of ports registered in the candidate port list (S1805). When the number of network permissible MEPs is larger than the number of ports (yes in S1805), the MEP-assigned port selection program 132 investigates whether another entry, which is not subjected to the processing of S1803 to S1805, exists in the port monitoring priority information 141, or not (S1806). On the other hand, when the number of network permissible MEPs is smaller than the number of ports (no in S1805), the processing is advanced to S1807.

When there is an unprocessed entry in S1806 (yes in S1806), the processing is returned to the processing of S1802, and the MEP-assigned port selection program 132 repeats a sequence of processing. On the other hand, when there is no unprocessed entry (no in S1806), the processing is advanced to S1807.

When the processing is advanced to S1807, the MEP-assigned port selection program 132 selects all of the ports registered in the candidate port list at this point as the MEP-assigned ports, and updates the MEP-assigned port selection information 143 (S1807).

In the control logic described above, the network monitoring server 1 first seriates the ports in the descending order of the monitor priorities calculated for each port. The network monitoring server 1 sets a port highest in the monitoring priority as a port to be processed in this control logic. Thereafter, the network monitoring server 1 selects the port highest in the monitoring priority to the ports to be processed in the descending order of the monitor priorities, and compares the smallest value (the number of network permissible MEPs) among the largest number of MEPs of the switches having the selected ports with the number of selected ports. When the number of selected ports is larger than the number of network permissible MEPs, or equal to the number of network permissible MEPs, the network monitoring server 1 increments the number of ports to be selected by 1, and again executes the comparison processing. When the number of selected ports is smaller than the number of network permissible MEPs, the network monitoring server 1 selects the assembly of the ports selected at a previous stage as the MEP-assigned ports. As a result, the MEP can be assigned to the ports of the number as large as possible while suppressing the control load on the switch. Also, when a failure occurs in a given server, the probability that the MEP is assigned to the ports of the switches connected to this server can be enhanced.

FIG. 19 is a table showing an example of the MEP-assigned port selection information 143 according to the first embodiment of the present invention. The MEP-assigned port selection information 143 stores information used for calculation to select the MEP-assigned port. The MEP-assigned port selection information 143 is data of a tabular form. Each entry of the MEP-assigned port selection information 143 is created on the port basis.

Each entry of the MEP-assigned port selection information 143 includes a monitoring priority of a port (monitoring priority), an identifier of the port (port), an identifier of a switch having the port (switch), an identifier of the type of the switch (type), the number of switch permissible MEPs representative of the maximum number of MEPs assignable to the switch (the number of switch permissible MEPs), and a flag representative of an port to which the number of network permissible MEPs (the number of NW permissible MEPs) and the MEP are to be assigned (MEP assigned).

The combination of the port monitoring priority, the identifier of the port, and the identifier of the switch is acquired from the port monitoring priority information 141. The number of switch permissible MEPs is retained by the MEP-assigned selection program 132 in advance. The number of switch permissible MEPs may be acquired directly from the subject switch through the operation management I/F of the switch by the network monitoring server 1 every time the control logic illustrated in FIG. 18 is executed.

FIG. 19 shows an example in which the MEP-assigned port is selected from the respective ports 0/1 and 0/2 of the switches "sw21", "sw22", "sw23", and "sw24". In this example, there are the switches of three types. The maximum number of assignable MEPs of the switches "sw21" and "sw22" is 10. The maximum number of assignable MEPs of the switch "sw23" is 5. The maximum number of assignable MEPs of the switch "sw24" is 1000.

When the MEP-assigned port selection program 132 executes the control logic shown in FIG. 18, the MEP-assigned port selection program 132 investigates whether the ports can be selected as the MEP-assigned port, or not, in the order from the port 0/1 of the switch "sw21" located at a head of the list. In this example, all of the numbers of switch permissible MEPs of first to fourth entries in the MEP-assigned port selection information 143 are 10. For that reason, the ports of those respective first to fourth entries are selected as the MEP-assigned ports.

Also, the number of switch permissible MEPs of a fifth entry is 5. For that reason, the number of network permissible MEPs for each port of the first to fifth entries of the MEP-assigned port selection information 143 is 5. In this case, the number of network permissible MEPs and the number of ports registered in the candidate port list are each 5 and equal to each other. For that reason, the port of the fifth entry is also selected as the MEP-assigned port.

On the other hand, the number of switch permissible MEPs of a sixth entry is 5. For that reason, the number of network permissible MEPs is 5. In this case, the number of network permissible MEPs is 5 whereas the number of ports registered in the candidate port list is 6. For that reason, the port of the sixth entry is not selected as the MEP-assigned port. Likewise, because ports of seventh and subsequent entries are not also larger than 5 in the number of network permissible MEPs, those ports are not selected as the MEP-assigned ports.

As described above, the network monitoring server 1 acquires the monitoring priority for each port from the port monitoring priority information 141. Then, the network monitoring server 1 compares the number of ports registered in the candidate port list in the descending order of the monitoring priority with the number of network permissible MEPs every time the ports to be processed is incremented by 1, thereby enabling an optimum assembly of the MEP-assigned ports to be selected.

Figure 20:
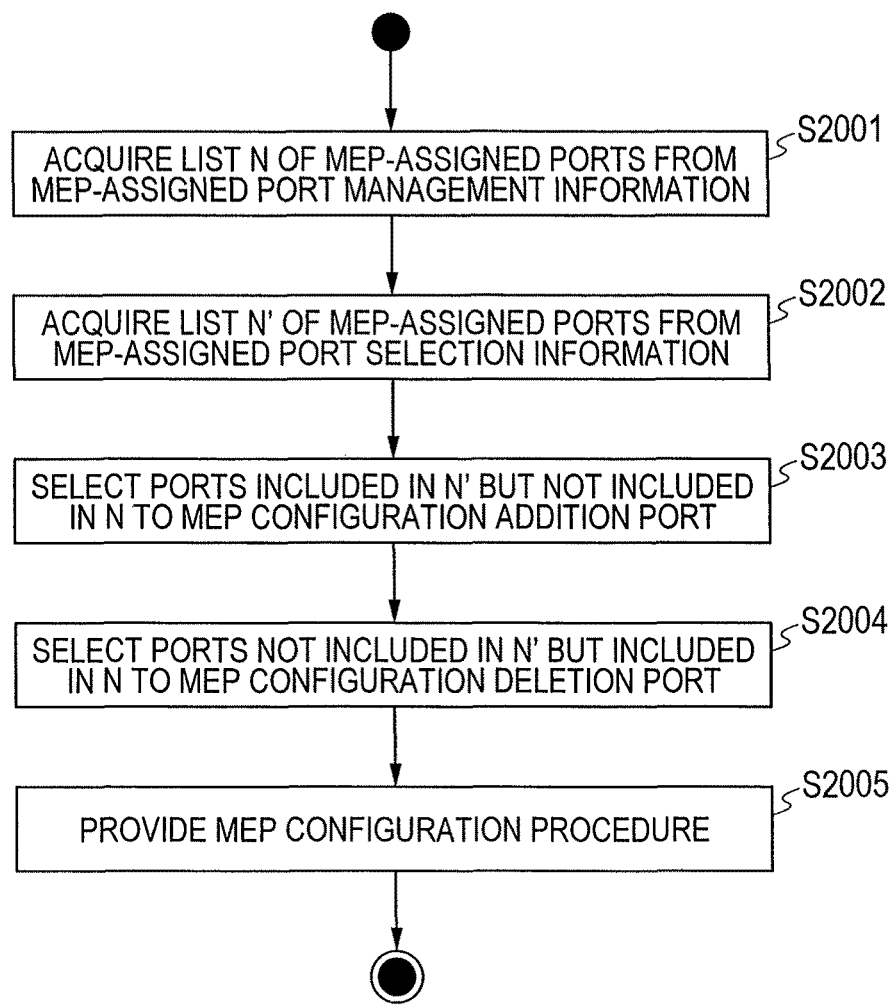
FIG. 20 is a flowchart showing a control logic for generating an MEP configuration procedure by an MEP configuration procedure generation program according to the first embodiment of the present invention.

FIG. 20 is a flowchart showing a control logic for generating an MEP configuration procedure by an MEP configuration procedure generation program 133 of the network monitoring server 1 according to the first embodiment of the present invention.

The MEP configuration procedure generation program 133 first acquires, from the MEP model information 142, a list N of the MEP-assigned ports at a time point when this program is executed (S2001). This processing is intended to acquire the present MEP configuration condition. The MEP configuration procedure generation program 133 then acquires a list N' of the ports selected as the MEP-assigned ports, from the MEP-assigned port selection information 143 that reflects the information on the MEP-assigned ports, which has been selected according to the control logic shown in FIG. 18 (S2002).

Thereafter, the MEP configuration procedure generation program 133 selects a port that is included in the list N' of the ports selected as the MEP-assigned ports, but not included in the list N of the present MEP-assigned ports as a port to which the MEP configuration should be added (S2003). Also, the MEP configuration procedure generation program 133 selects a port that is not included in the list N' of the ports selected as the MEP-assigned ports, but included in the list N of the present MEP-assigned ports as a port from which the MEP configuration should be deleted (S2004).

Thereafter, the MEP configuration procedure generation program 133 provides, to the network manager, a list of the ports to which the MEP configuration should be added and the ports from which the MEP configuration should be deleted (S2005). In this example, the MEP configuration procedure generation program 133 provides, to the network manager, the MEP configuration procedure display GUI 76 illustrated in FIG. 9.

In the above-mentioned control logic, the network monitoring server 1 compares the list N of the MEP-assigned ports at the time point when the MEP configuration procedure generation program 133 is executed (a previous time point) with the list N' of the MEP-assigned ports selected according to the control logic shown in FIG. 18 (a subsequent time point). Thereafter, the network monitoring server 1 selects the ports to which the MEP configuration should be added and the ports from which the MEP configuration should be deleted, on the basis of the comparison of the lists N and N' of the ports at the previous and subsequent time points. Thereafter, the network monitoring server 1 provides, to the network manager, the list of the ports to which the MEP configuration should be added and the ports from which the MEP configuration should be deleted, as with the MEP configuration procedure display GUI 76 illustrated in FIG. 9. As a result, the MEP-assigned port can be changed promptly in time for a change in the system configuration.

Second Embodiment

A network monitoring server according to a second embodiment of the present invention outputs a procedure of changing the MEP configuration according to an instruction from the network manager. The network monitoring server instructs which port should be added to the list of the MEP-assigned ports at which time point, or which port should be deleted from the list of the MEP-assigned ports at which time point, on the basis of a change with time of the monitoring priority of each port.

The second embodiment of the present invention is different from the above-mentioned first embodiment (refer to FIGS. 2 and 18) in the provision of MEP configuration schedule 144 and MEP configuration procedure 145 in the network monitoring server 1, and the operation of the MEP configuration procedure generation program 133. For that reason, the configuration of the network monitoring server 1 and the operation of the MEP configuration procedure generation program 133 will be mainly described, and the repetitive description of the common configurations and operation will be omitted.

Figure 21:
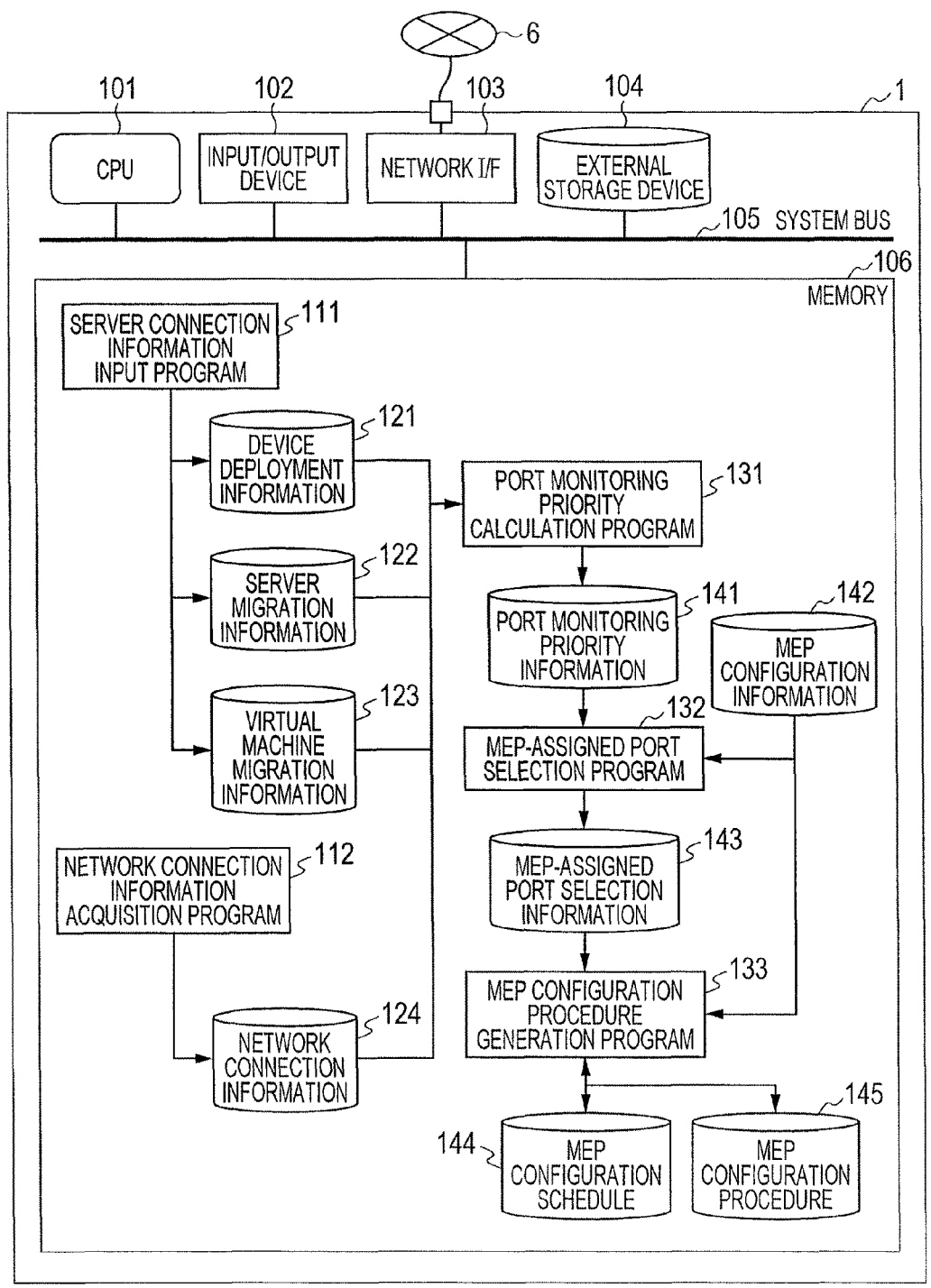
FIG. 21 is a diagram illustrating a configuration example of a network monitoring server according to a second embodiment of the present invention.

FIG. 21 is a diagram illustrating a configuration example of the network monitoring server 1 according to the second embodiment of the present invention. In the memory 106 of the network monitoring server 1 are stored the MEP configuration schedule 144 and the MEP configuration procedure 145.

The MEP configuration schedule 144 manages information on the MEP configuration schedule. More specifically, the MEP configuration schedule 144 manages the list of the MEP-assigned ports every given time. The detail will be described with reference to FIG. 23 later.

The MEP configuration procedure 145 manages information on the MEP configuration procedure. More specifically, the MEP configuration procedure 145 manages information on the MEP configuration procedure every given time. The detail will be described with reference to FIG. 24 later.

Figure 22:
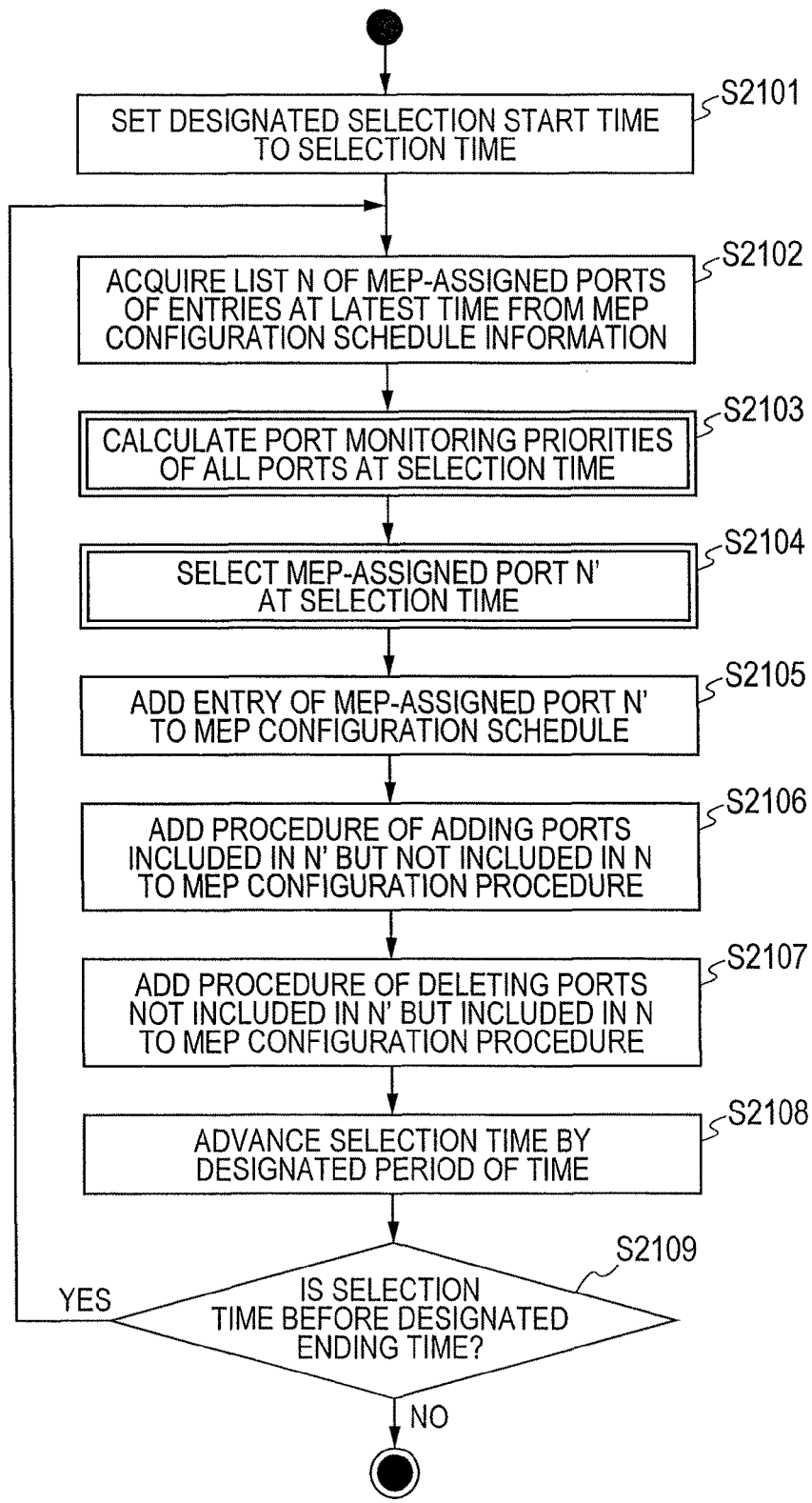
FIG. 22 is a flowchart showing a control logic for generating an MEP configuration procedure by an MEP configuration procedure generation program according to the second embodiment of the present invention.

FIG. 22 is a flowchart showing a control logic for generating an MEP configuration procedure by the MEP configuration procedure generation program 133 of the network monitoring server 1 according to the second embodiment of the present invention.

The MEP configuration procedure generation program 133 first sets a value of a calculation start-up times designated from the network manager to a calculation time (S2101). The MEP configuration procedure generation program 133 then acquires the list N of the ports of the entries at the latest time from the MEP configuration schedule 144 (S2102). When no data exists in the MEP configuration schedule 144, N becomes an empty set.

Thereafter, the MEP configuration procedure generation program 133 calculates the monitoring priorities of all the ports at the calculation time according to a control logic indicated in S1401 to S1411 of FIG. 14 (S2103).

Thereafter, the MEP configuration procedure generation program 133 selects the list N' of the MEP-assigned ports at the calculation time according to a control logic indicated in S1801 to S1807 of FIG. 18 on the basis of the calculated results of the port monitoring priorities.

Thereafter, the MEP configuration procedure generation program 133 newly creates, in the MEP configuration schedule 144, an entry that associates the calculation time set in S2101 with the list N' of the MEP-assigned ports selected in S2104 (S2105).

Thereafter, the MEP configuration procedure generation program 133 adds, to the MEP configuration procedure 145, a procedure of adding the ports that are included in the list N' of the ports, but not included in the list N of the ports (S2106). More specifically, the MEP configuration procedure generation program 133 first obtains the list of the ports that are included in the list N' of the ports, but not included in the list N of the ports. Thereafter, the MEP configuration procedure generation program 133 adds, to the MEP configuration procedure 145, an entry representing that the MEP is assigned to the obtained list of the ports.

The MEP configuration procedure generation program 133 also adds, to the MEP configuration procedure 145, a procedure of deleting the ports that are not included in the list N' of the ports, but included in the list N of the ports (S2107). More specifically, the MEP configuration procedure generation program 133 obtains the list of the ports that are not included in the list N' of the ports, but included in the list N of the ports. Thereafter, the MEP configuration procedure generation program 133 adds, to the MEP configuration procedure 145, an entry representing that the MEP assigned to the obtained list of the ports is deleted.

Thereafter, the MEP configuration procedure generation program 133 advances the calculation time by a designated period of time (S2108), and investigates whether the calculation time is before a calculation ending time designated by the network manager, or not (S2109). When the calculation time is before the designated ending time (yes in S2109), the MEP configuration procedure generation program 133 returns to S2102, and repeats a sequence of processing at the updated calculation time. On the other hand, when the calculation time reaches the designated ending time (no in S2109), the processing is terminated.

In the above-mentioned control logic, the network monitoring server 1 calculates the port monitoring priority of each port every plural time points designated by a user in a period of time designated by the user, and creates a list of the MEP-assigned ports at each time point. Thereafter, the network monitoring server 1 selects the ports to which the MEP configuration should be added and the ports from which the MEP configuration should be deleted, on the basis of the comparison of the lists N and N' of the ports at the previous and subsequent time points. Thereafter, the network monitoring server 1 provides, to the network manager, the list of the ports to which the MEP configuration should be added and the ports from which the MEP configuration should be deleted, as with the MEP configuration procedure display GUI 76 illustrated in FIG. 9. As a result, the network manager can grasp at which time point the MEP configuration of the switch should be changed (added or deleted). As a result, the MEP configuration change operation can be scheduled in time for a change in the system configuration in advance.

FIG. 23 is a table showing a configuration example of the MEP configuration schedule 144 according to the second embodiment of the present invention. The MEP configuration schedule 144 is data of a tabular form. The MEP configuration schedule 144 is created as a work area when the MEP configuration procedure generation program 133 executes the control logic shown in FIG. 22.

Each entry of the MEP configuration schedule 144 includes the calculation time and the list of the MEP-assigned ports at the calculation time.

FIG. 23 shows an example in which two servers "www1" and "app1" are connected to the network as in the above-mentioned first embodiment. For simplification, it is assumed that the number of assignable MEPs within the network is 2 at a maximum.

In this example, it is assumed that each of the servers is configured according to the following schedule. That is, the server manager first newly connects the server "www1" to the port 0/1 of the switch "sw21" in January of 2006. The server manager then newly connects the server "app1" to the port 0/1 of the switch "sw22" in January of 2007. Thereafter, the server manager changes the connected port of the server "www1" from the port 0/1 of the switch "sw21" to the port 0/2 in January of 2008. Further, the server manager newly creates a virtual machine on the server "www1" in January of 2009.

Under the above assumption, the MEP configuration procedure generation program 133 executes the control logic shown in FIG. 21. As a result, in an entry 1442 of the MEP configuration schedule 144 in January of 2006 is registered the port 0/1 of the switch "sw21". Also, in an entry 1443 in January of 2007 are registered the port 0/1 of the switch "sw21" and the port 0/1 of the switch "sw22". Further, in entries in January of 2008 and January of 2009 are registered the port 0/2 of the switch "sw21" and the port 0/1 of the switch "sw22".

FIG. 24 is a table showing a configuration example of the MEP configuration procedure 145 according to the second embodiment of the present invention. The MEP configuration procedure 145 is data of a tabular form. The MEP configuration procedure 145 is created when the MEP configuration procedure generation program 133 executes the control logic shown in FIG. 21.

Each entry of the MEP configuration procedure 145 includes a date and time when the configuration change is executed (configuration execution date), an identifier of the operation type (operation type), an identifier of a switch having a port to be configured, and an identifier of the port to be configured (subject port). In the operation type is stored any one of "add" and "delete".

The MEP configuration procedure 145 shown in an example of FIG. 24 is data generated on the basis of the MEP configuration schedule 144 of FIG. 23. That is, in the MEP configuration procedure 145 is registered an entry 1451 that the MEP is added to the port 0/1 of the switch "sw22" in January of 2007. Also, an entry 1453 that the MEP is deleted from the port 0/1 of the switch "sw21" in January of 2008 is registered therein. Further, an entry 1454 that the MEP is added to the port 0/2 of the switch "sw21" in January of 2008 is registered therein.

Third Embodiment

A network monitoring server according to a third embodiment of the present invention monitors a network that has been divided into plural logic networks by a VLAN. The network monitoring server selects the maximum number of assignable MEPs while suppressing the control load of the switch in the network using the VLAN.

According to the third embodiment of the present invention, the configuration of the network 20 to be monitored by the network monitoring server 1 and the operation of the MEP-assigned port selection program 132 are different from those in the above-mentioned first embodiment (refer to FIGS. 1 and 18). For that reason, the configuration of the network 20 and the operation of the MEP-assigned port selection program 132 will be mainly described, and the repetitive description of the common configurations and operation will be omitted.

Figure 25:
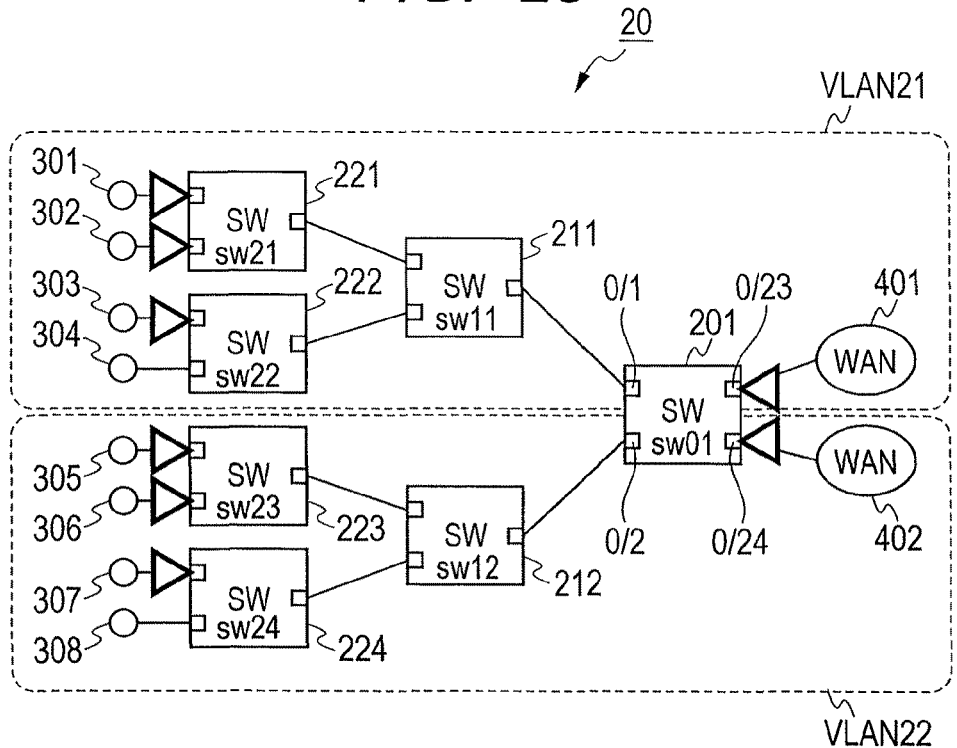
FIG. 25 is a diagram illustrating a configuration example of a network monitored by a network monitoring server according to a third embodiment of the present invention.

FIG. 25 is a diagram illustrating a configuration example of the network 20 monitored by the network monitoring server 1 according to the third embodiment of the present invention. The network 20 is a network using the VLAN. The network 20 includes the switches 201 to 224 connected to each other in a tree shape. Also, the ports 0/23 and 0/24 of the switch 201 are connected with the WANs 401 and 402, respectively.

Each port of the switches 201 to 224 within the network 20 according to the third embodiment of the present invention has an identifier configured to belong to any VLAN of the "VLAN 21" and the "VLAN 22". In FIG. 25, all the ports of the switch 211, the switch 221, and the switch 222, and the port 0/1 and the port 0/23 of the switch 201 belong to the VLAN 21. Also, all the ports of the switch 212, the switch 223, and the switch 224, and the port 0/1 and the port 0/24 of the switch 201 belong to the VLAN 22.

Figure 26:
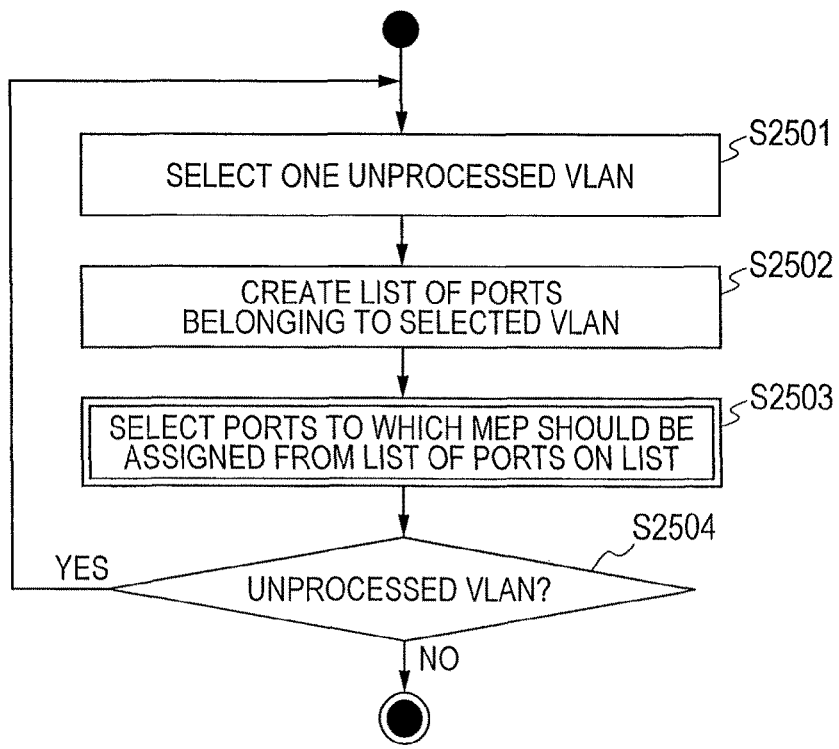
FIG. 26 is a flowchart showing a control logic for selecting an MEP-assigned port in an MEP-assigned port select program of the network monitoring server according to the third embodiment of the present invention.

FIG. 26 is a flowchart showing a control logic for selecting an MEP-assigned port in the MEP-assigned port select program 132 of the network monitoring server 1 according to the third embodiment of the present invention.

The MEP-assigned port selection program 132 first selects one unprocessed VLAN from a list of the VLANs used on the network (S2501). The MEP-assigned port selection program 132 then creates a list of the ports that belong to the VLAN selected in S2501 from the configuration of the VLAN to which each port within the network belongs (S2502).

Thereafter, the MEP-assigned port selection program 132 selects ports of only the entries corresponding to the ports registered in the list created in S2502, among the respective entries of the port monitoring priority information 141, as the MEP-assigned ports (S2503). In this example, the MEP-assigned ports are selected according to the control logic of FIG. 18 in the above-mentioned first embodiment.

Thereafter, the MEP-assigned port selection program 132 investigates whether there is an unprocessed VLAN, or not (S2504). When there is the unprocessed VLAN (yes in S2504), the MEP-assigned port selection program 132 returns to S2501, selects one of the unprocessed VLANs, and repeats a sequence of processing. On the other hand, when there is no unprocessed VLAN (no in S2504), the MEP-assigned port selection program 132 terminates the processing.

Through the above-mentioned processing, the network monitoring server 1 narrows down the MEP-assigned ports to be selected on the basis of the configuration of the VLAN. In this manner, the third embodiment of the present invention can be applied to the network using the VLAN.

Fourth Embodiment

A network monitoring server according to a fourth embodiment of the present invention monitors a network including a switch having no Ethernet-OAM function, that is, an Ethernet-OAM unsupported switch to whose port the MEP cannot be assigned.

In a general network, all of the switches within the network are not always supported by the Ethernet OAM. The network monitoring server according to the fourth embodiment of the present invention can prioritize the ports to which the MEP is assigned in the network where the Ethernet-OAM supported switches and the Ethernet-OAM unsupported switches are mixed together.

According to the fourth embodiment of the present invention, the configuration of the network 20 to be monitored by the network monitoring server 1, the configuration of the network monitoring server 1, and the operation of the port monitoring priority calculation program 131 are different from those of the above-mentioned first embodiment (refer to FIGS. 1, 2, and 14). For that reason, the configuration of the network 20, the configuration of the network monitoring server 1, and the operation of the port monitoring priority calculation program 131 will be mainly described, and the repetitive description of the common configurations and operation will be omitted.

Figure 27:
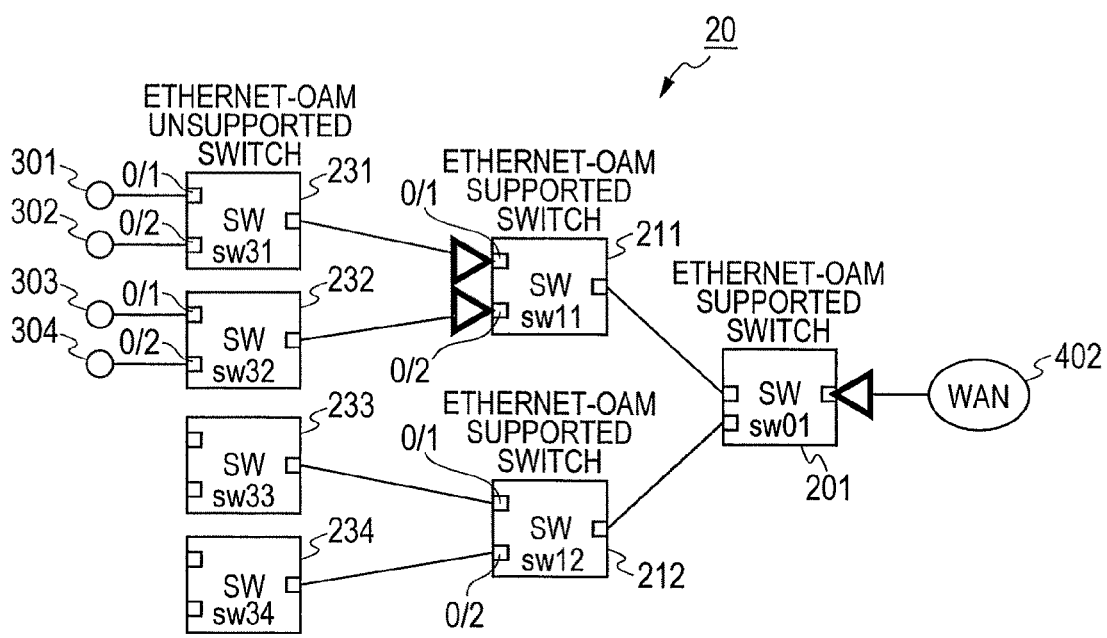
FIG. 27 is a diagram illustrating a configuration example of a network monitored by a network monitoring server according to a fourth embodiment of the present invention.

FIG. 27 is a diagram illustrating a configuration example of the network 20 monitored by the network monitoring server 1 according to the fourth embodiment of the present invention. The network 20 includes the Ethernet-OAM supported switches 201, 211, and 212 whose identifiers are "sw01", "sw11", and "sw12", and Ethernet-OAM unsupported switches 231 to 234 whose identifiers are "sw31", "sw32", "sw33", and "sw34".

In this example, the Ethernet-OAM unsupported switches 231 and 232 are connected to the port 0/1 and port 0/2 of the Ethernet-OAM supported switch 211, respectively. Also, the Ethernet-OAM unsupported switches 233 and 234 are connected to the port 0/1 and the port 0/2 of the Ethernet-OAM supported switch 212, respectively. Further, the port 0/1 and the port 0/2 of the switch 231 are connected with the servers 301 and 302, respectively. Further, the port 0/1 and the port 0/2 of the switch 232 are connected with servers 303 and 304, respectively.

In this example, the switches 231 and 232 are the Ethernet-OAM unsupported switches. For that reason, the network monitoring server 1 selects the ports 0/1 and 0/2 of the switch 211 as the MEP-assigned ports. That is, the MEP is assigned to the port 0/1 of the switch 211, to thereby monitor a network portion including the switch 231, the server 311, and the server 312. Likewise, the MEP is assigned to the port 0/2 of the switch 211, to thereby monitor a network portion including the switch 232, the server 313, and the server 314.

Figure 28:
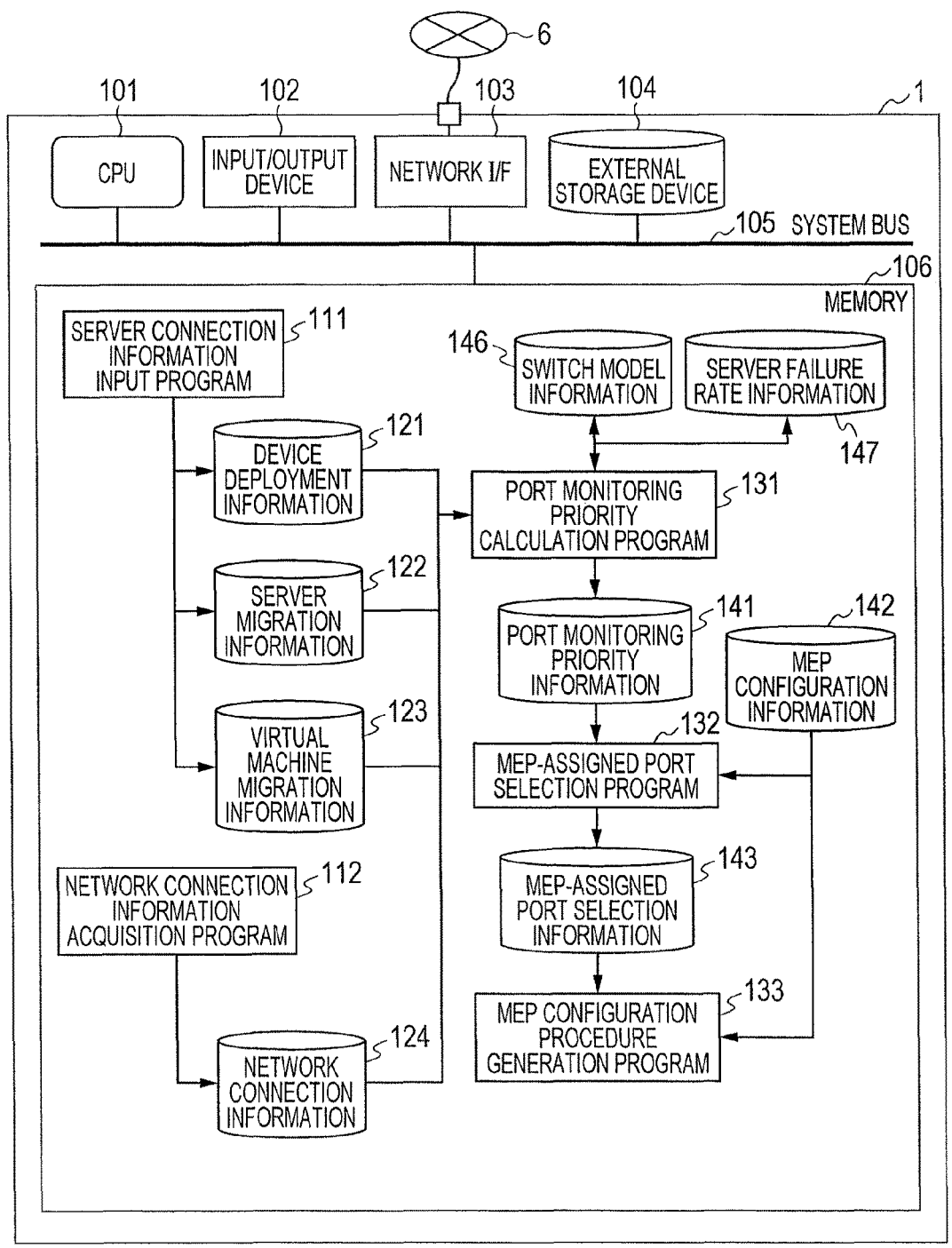
FIG. 28 is a diagram illustrating a configuration example of the network monitoring server according to the fourth embodiment of the present invention.

FIG. 28 is a diagram illustrating a configuration example of the network monitoring server 1 according to the fourth embodiment of the present invention. In the memory 106 of the network monitoring server 1 is stored a switch model information 146 and a server failure rate information 147.

The switch model information 146 manages information on the type of the respective switches 201 to 224 within the network 20. The detail will be described later with reference to FIG. 29.

The server failure rate information 147 manages information on the failure rate of the respective servers 301 to 304 within the network 20. The detail will be described later with reference to FIG. 31.

FIG. 29 is a table showing a configuration example of the switch model information 146 according to the fourth embodiment of the present invention. The switch model information 146 is data of a tabular form.

Each entry of the switch model information 146 includes an identifier of a switch, and a flag indicating whether the switch is supported by the Ethernet-OAM, or not.

In this example, the switches "sw01", "sw11", and "sw12" are registered as the Ethernet-OAM supported switches. Also, the switches "sw31", "sw32", "sw33", and "sw34" are registered as the Ethernet-OAM unsupported switches.

Figure 30:
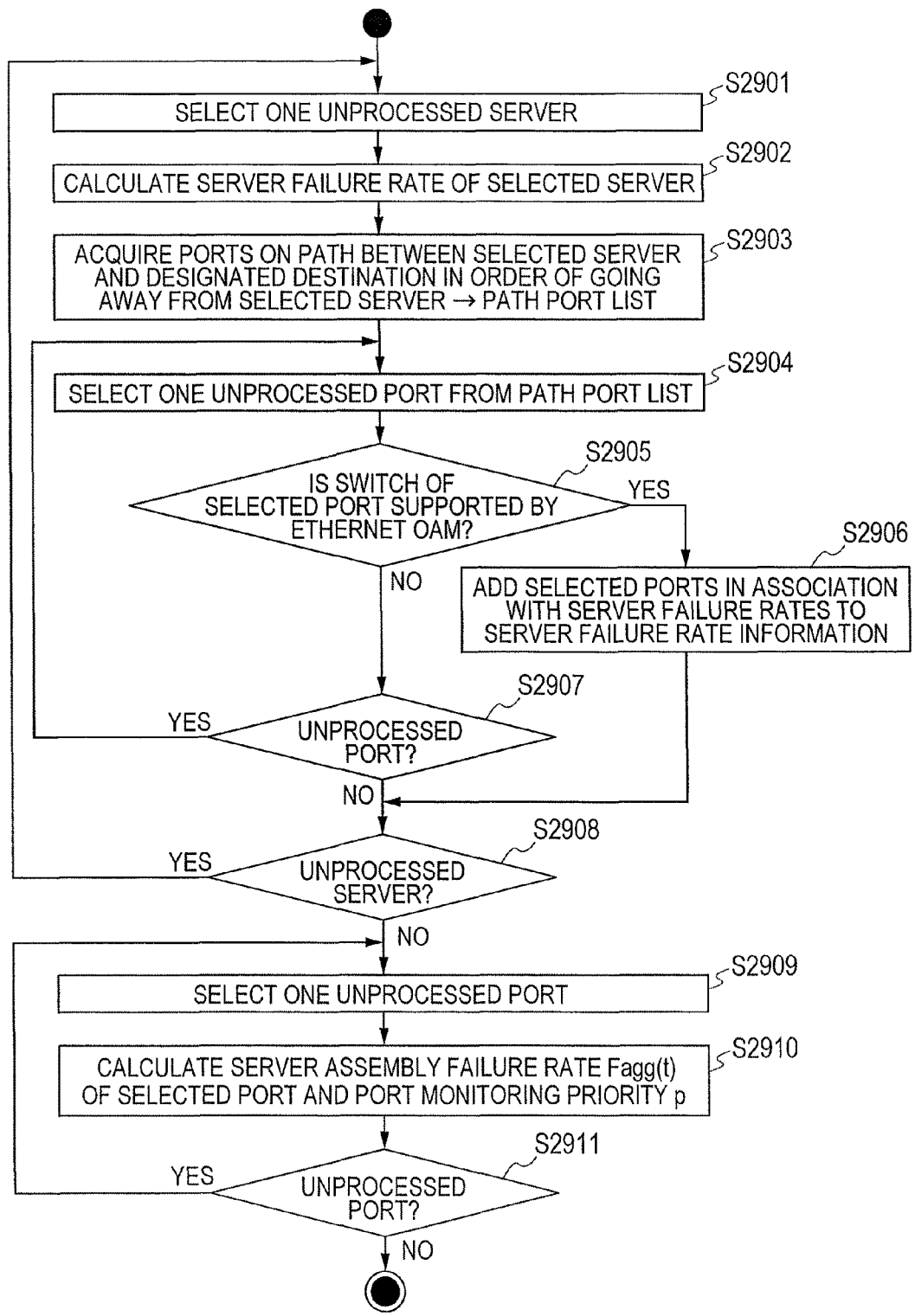
FIG. 30 is a flowchart showing a control logic of a port monitoring priority calculation program in the network monitoring server according to the fourth embodiment of the present invention.

FIG. 30 is a flowchart showing a control logic of the port monitoring priority calculation program 131 in the network monitoring server 1 according to the fourth embodiment of the present invention.

The port monitoring priority calculation program 131 first selects one unprocessed server from a list of the servers within the network (S2901). The port monitoring priority calculation program 131 then calculates the failure rate of the selected server on the basis of the device deployment information 121, the server migration information 122, and the virtual machine migration information 123 (S2902). In this example, the port monitoring priority calculation program 131 obtains an accumulative operating time of the selected server and an elapsed time after the configuration has been changed. Thereafter, the port monitoring priority calculation program 131 calculates the failure rate of the server on the basis of the values of the obtained times (like S1404 to S1409 in FIG. 14).

Thereafter, the port monitoring priority calculation program 131 acquires information on each port of the switches existing on a path between the selected server and the designated destination in order of going away from the selected server (S2903). Also, the port monitoring priority calculation program 131 retains a list of the acquired ports as a path port list in which the ports are arranged in order to going away from the selected server. The information on the designated destination of the selected server is acquired from the server migration information 122.

Thereafter, the port monitoring priority calculation program 131 selects one unprocessed port from the path port list (S2904). Then, the port monitoring priority selection program 131 investigates whether the switch having the selected port is supported by the Ethernet-OAM, or not, on the basis of the switch model information 146 (S2905). When the switch is not supported by the Ethernet-OAM (no in S2905), the port monitoring priority selection program 131 investigates whether there is an unprocessed port on the path port list, or not (S2907). When there is the unprocessed port (yes in S2907), the port monitoring priority selection program 131 selects one unprocessed port, and again investigates whether the switch having that port is supported by the Ethernet-OAM, or not.

When any one of the switches having the ports registered in the path port list is supported by the Ethernet-OAM (yes in S2905), the port monitoring priority selection program 131 registers data that associates an identifier of the selected port, an identifier of a switch having that port, and the server failure rate calculated in S2902 with each other, in the server failure rate information 147 as a new entry (S2906).

Thereafter, the port monitoring priority selection program 131 investigates whether the unprocessed server exists in the servers within the network, or not (S2907). When there is the unprocessed server (yes in S2907), the processing returns to S2901, and the port monitoring priority selection program 131 selects one unprocessed server, and repeats a sequence of processing of S2901 to S2907. On the other hand, when there is no unprocessed server (no in S2907), the processing is advanced to S2909.

Through the above-mentioned processing of S2901 to S2907, the network monitoring server 1 can associate the failure rate of each server with a port of the Ethernet-OAM supported switch closest to the server among the respective ports that exist on a path between the server and the designated destination, with respect to all of the servers within the network.

Thereafter, the port monitoring priority selection program 131 selects one unprocessed port from all of the ports within the network (S2909). Thereafter, the port monitoring priority selection program 131 calculates a server aggregation failure rate Fagg(t) and the port monitoring priority p of the selected port (S2910). More specifically, the port monitoring priority selection program 131 first retrieves an entry including the selected port from the server failure rate information 147. The port monitoring priority selection program 131 then acquires the server failure rate of each retrieved entry. Thereafter, the port monitoring priority selection program 131 calculates the server aggregation failure rate Fagg(t) on the basis of the acquired failure rate of each server. The server aggregation failure rate Fagg(t) means a failure rate obtaining by aggregating the failure rates of the plural servers accommodated by the connected switch (in this example, a switch having the port selected in S2909), that is, all of the servers that exist on a path at an edge switch side of the connected switch. The server aggregation failure rate Fagg(t) is calculated by the following Expression (8). Thereafter, the port monitoring priority selection program 131 calculates the port monitoring priority p as a value proportional to the server aggregation failure rate Fagg(t).

$$Fagg(t)=1-\Pi[1-Fi(t)](i=0,1,2,\ldots) \qquad (8)$$

In Expression (8), Fi(t) is a failure rate calculated for each of the servers connected to an opposed switch of the port whose monitoring priority should be calculated. Fi(t) corresponds to (failure rate F(t) for calculating the port monitoring priority p shown in FIG. 17)=(switch degradation failure rate Fsw(t))+(server degradation failure rate Fwear(t))+(server initial failure rate Finit(t))+(server change-related failure rate Fchg(t)).

Thereafter, the port monitoring priority selection program 131 investigates whether there is an unprocessed port, or not (S2911). When there is an unprocessed port (yes in S2911), the processing returns to S2909, and the port monitoring priority selection program 131 repeats the processing of S2909 to S2911 until completing processing of all the ports.

Through the above-mentioned processing, the network monitoring server 1 increases the port monitoring priority p with an increase in the server aggregation failure rate Fagg(t). As a result, the network monitoring server 1 can appropriately prioritize the ports to which the MEP is assigned in the network where the Ethernet-OAM supported switches and the Ethernet-OAM unsupported switches are mixed together.

FIG. 31 is a table showing a configuration example of the server failure rate information 147 according to the fourth embodiment of the present invention. The server failure rate information 147 is data of a tabular form. The server failure rate information 147 is created as a work area when the port monitoring priority selection program 131 executes the control logic shown in FIG. 30.

Each entry of the server failure rate information 147 includes an identifier of a server to be managed (server), a failure rate of the server to be managed (failure rate), an identifier of a switch that accommodates the server to be managed (accommodation switch), and an identifier of a port that connects the server to be managed.

FIG. 31 shows an example of the server failure rate information 147 created on the basis of the configuration of the network 20 shown in FIG. 27. Entries 1471 to 1474 of the server failure rate information 147 correspond to the servers 301 to 304, respectively. In a column of the failure rate are stored the server failure rates calculated for the respective servers 301 to 304. That the accommodation switch is "sw11" and the accommodation port is "0/1" is common to the entries 1471 and 1472. Also, that the accommodation switch is "sw11" and the accommodation port is "0/2" is common to the entries 1473 and 1474.

As described above, the network monitoring server 1 according to the fourth embodiment of the present invention calculates the port monitoring priority p with the use of the server aggregation failure rate Fagg(t) in the network where the Ethernet-OAM supported switches and the Ethernet-OAM unsupported switches are mixed together. However, the present invention is not limited to this calculating method. For example, the network monitoring server 1 may calculate the port monitoring priority p on the basis of a sum of the server failure rates of the plural servers which are accommodated by the connected switch. Similarly, in this case, the network monitoring server 1 can appropriately prioritize the ports to which the MEP is assigned.

Fifth Embodiment

A network monitoring system according to a fifth embodiment of the present invention includes a network monitoring server and an external server. In the network monitoring system, plural servers operate in cooperation with each other, to thereby promptly change the configuration of the MEP-assigned ports in time for a change in the network configuration.

According to the fifth embodiment of the present invention, the configuration and operation of the network monitoring system 10 are different from those in the above-mentioned first embodiment (refer to FIGS. 1 and 3). For that reason, the configuration and operation of the network monitoring system 10 will be mainly described, and the repetitive description of the common configurations and operation will be omitted.

Figure 32:
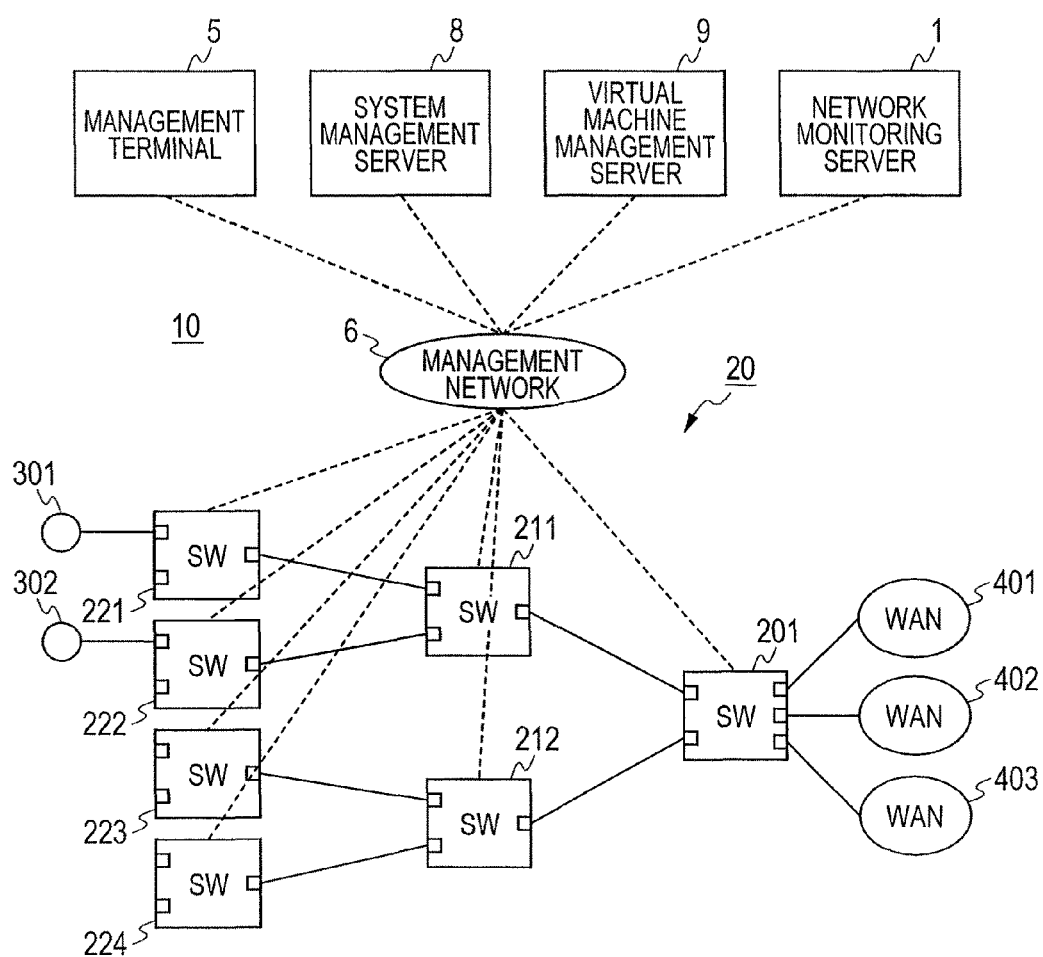
FIG. 32 is a diagram illustrating a configuration example of a network monitoring system according to a fifth embodiment of the present invention.

FIG. 32 is a diagram illustrating a configuration example of the network monitoring system 10 according to the fifth embodiment of the present invention. The network monitoring system 10 includes a system management server 8 and an virtual machine management server 9.

The system management server 8 is a computer device that manages a physical server within the network monitoring system 10. On the other hand, the virtual machine management server 9 is a computer device that manages a virtual machine within the network monitoring system 10. The operation of the system management server 8 and the virtual machine management server 9 will be described later with reference to FIG. 33.

Figure 33:
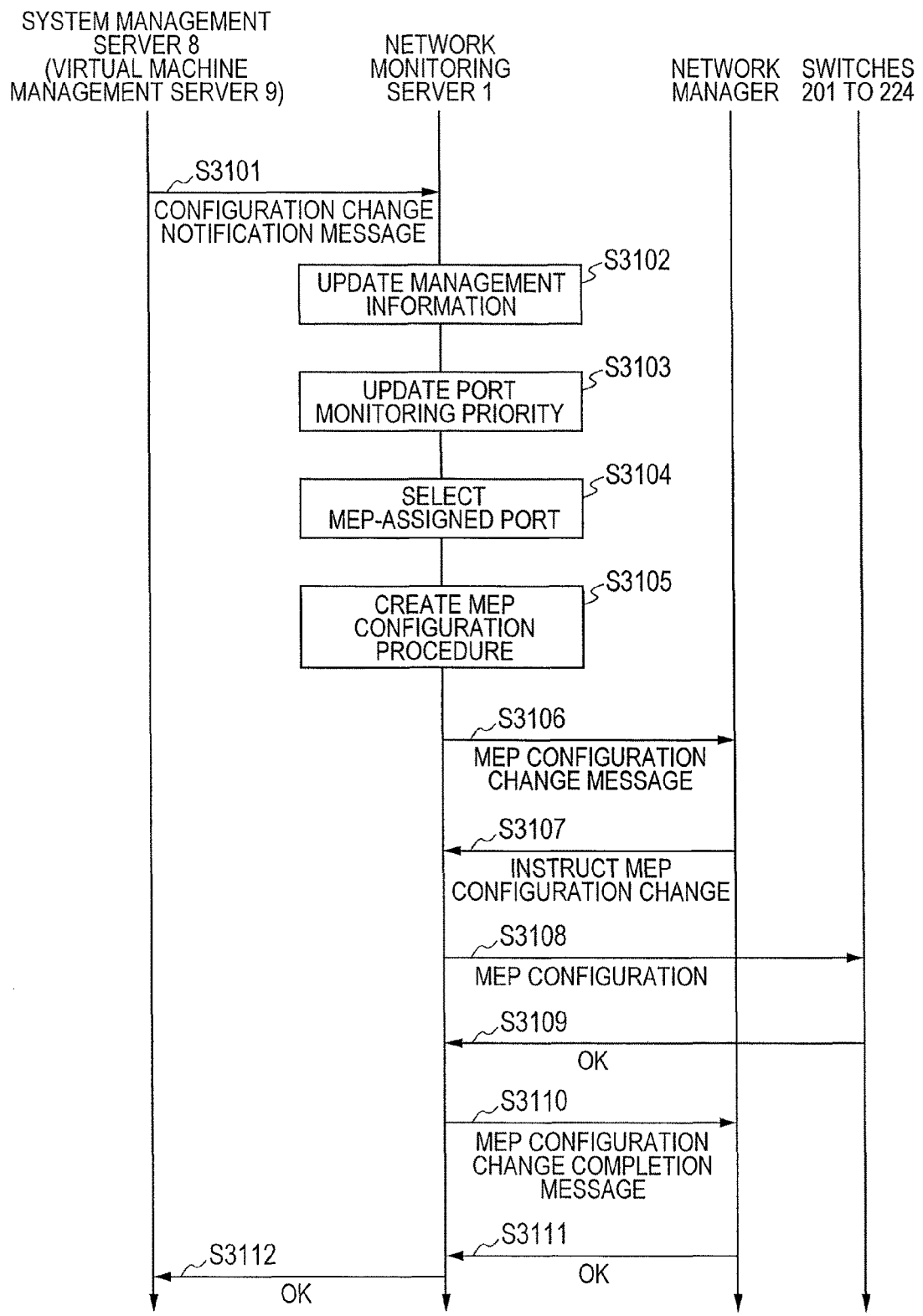
FIG. 33 is a sequence diagram showing a control logic of the network monitoring system according to the fifth embodiment of the present invention.

FIG. 33 is a sequence diagram showing a control logic of the network monitoring system 10 according to the fifth embodiment of the present invention. In this example, a process of changing the configuration of the MEP in the network monitoring system 10 will be described.

The system management server 8 and the virtual machine management server 9 first transmit, to the network monitoring server 1, a configuration change notification message for notifying the configuration change of the network monitoring system 10 (S3101). The configuration change notification message will be described later with reference to FIGS. 34 and 35.

Upon receiving the configuration change notification message, the network monitoring server 1 updates management information on the device deployment information 121, the server migration information 122, or the virtual machine migration information 123 (S3102). Thereafter, the network monitoring server 1 calculates the monitoring priority of each port of the switches within the network according to the control logic shown in FIG. 14 (S3103). Thereafter, the network monitoring server 1 selects the MEP-assigned port according to the control logic shown in FIG. 18 (S3104). Then, the network monitoring server 1 creates the MEP configuration procedure according to the control logic shown in FIG. 20 (S3105).

Thereafter, the network monitoring server 1 notifies the network manager of an MEP configuration change message including the contents of the created MEP configuration change procedure (S3106). The network manager confirms the contents of the MEP configuration change message, and instructs the network monitoring server 1 to change the configuration of the MEP (S3107).

Thereafter, the network monitoring server 1 instructs the configuration of the MEP to the appropriate switch on the basis of the instruction (S3108). Then, the network monitoring server 1 receives the configuration result of the MEP from the switch (S3109).

Thereafter, the network monitoring server 1 notifies the network manager of a message indicating that the MEP configuration change has been completed (S3110). The network manager confirms this message, and transmits a confirmation message to the network monitoring server 1 (S3111). Upon receiving the confirmation message, the network monitoring server 1 transmits the confirmation message to the system management server 8 or the virtual machine management server 9 (S3112).

As described above, in the network monitoring system 10 according to the fifth embodiment of the present invention, the system management server 8 or the virtual machine management server 9 has a function of notifying the configuration change of the network monitoring system 10. Also, the network monitoring server 1 has a function of executing three processing including the calculation of the port monitoring priority, the selection of the MEP-assigned port, and the creation of the MEP configuration procedure, on the basis of a notification of the configuration change, which has been received from the system management server 8 or the virtual machine management server 9. As a result, the network monitoring server 1 can promptly change the configuration of the ports to be monitored in time for a change in the network configuration.

FIG. 34A is a diagram showing a first example of the configuration change notification message according to the fifth embodiment of the present invention. FIG. 34B is a diagram showing a second example of the configuration change notification message according to the fifth embodiment of the present invention. FIGS. 34A and 34B show configuration examples of the configuration change notification message used in S3101 of FIG. 33.

FIG. 34A shows a physical server addition notification message 3201 that is a message for notifying the new deployment of the physical server. On the other hand, FIG. 34B shows a physical server migration notification message 3202 that is a message for notifying the migration of the physical server.

Those messages 3201 and 3202 are each data of the XML format. The "event" element that is a higher element of the messages 3201 and 3202 represents the configuration change notification message. The "type" element represents the message type of the configuration change notification message. The "occurred" element represents migration start time. The "server" element is an element representative of the server to be configured. The "hostname" element under the "server" element represents a host name. The "netif" element represents the network I/F. The "targetport" element represents the connected port of the server. The "switch" element under the "targetport" element ("sourceport element") represents the switch. The "port" element represents the port of the switch.

The destination element of the physical server addition notification message 3201 represents the designated destination of the server to be configured. The "sourceport" element of the physical server migration notification message represents the source port of the server to be configured.

FIG. 35A is a diagram showing a third example of the configuration change notification message according to the fifth embodiment of the present invention. FIG. 35B is a diagram showing a fourth example of the configuration change notification message according to the fifth embodiment of the present invention. FIGS. 35A and 35B show configuration examples of the configuration change notification message used in S3101 of FIG. 33.

FIG. 35A shows a virtual machine addition notification message 3301 for notifying the new deployment of the virtual machine. FIG. 35B shows a virtual machine migration notification message 3302 for notifying the migration of the virtual machine.

Those messages 3301 and 3302 are each data of the XML format. The "event" element, the "type" element, and the "occurred" element of the messages 3301 and 3302 are identical with those in the configuration change notification messages 3201 and 3202 shown in FIGS. 34A and 34B, and their description will be omitted.

The "virtualmachine" element represents one virtual machine. The "targetserver" element represents a physical server which is a host server of the virtual machine designated by the "virtualmachine" element. The "hostname" element that is a lower element of those three kinds of elements represents a host name, and the "netif" element represents the network I/F.

The "sourceserver" element of the virtual machine migration notification message 3302 represents a physical server that has been a host server of the virtual machine before the migration of the virtual machine.

The respective embodiments of the present invention have been described above. However, the respective embodiments represent applied examples of the present invention, and the technical scope of the present invention is not limited to specific configurations of the respective embodiments. The present invention can be variously changed without departing from the subject matter of the present invention.

What is claimed is:

1. A network monitoring server that monitors a network having a plurality of switch devices, in which the plurality of switch devices each have a communication confirmation function using transmission and reception of a monitoring frame between ports, and an upper limit is set to the number of ports to which maintenance end points are assignable among the respective ports of the plurality of switch devices, the network monitoring server comprising:
a processor that executes a program;
a memory that stores the program executed by the processor therein; and
an interface that is connected to the processor, wherein
the processor calculates, for each of the plurality of switch devices, a monitoring priority corresponding to the probability of failures of a device connected to a network path including the port or the port, and generates data for displaying the calculated monitoring priority of each port in association with each port, and when the processor calculates the monitoring priority of a given port, the processor enhances the monitoring priority of the given port based on an accumulative operating time of a device connected to the given port or an accumulative operating time of each switch device that exists on a network path between one device connected to the given port and another device connected to the one device.

2. The network monitoring server according to claim 1, wherein when the processor calculates the monitoring priority of a given port, the processor temporarily increases the monitoring priority of the given port until a given period of time elapses since a device newly connected to the given port starts to operate.

3. The network monitoring server according to claim 1, wherein when the processor generates the data for displaying, the processor selects the ports in the descending order of the monitoring priority, and repeats a comparison of the number of ports from a port highest in the monitoring priority to a port currently selected with a minimum value among the number of monitored points assignable to each switch device having the ports, and wherein when the number of ports is equal to or lower than the minimum value, the processor selects, as ports to be monitored, ports from a port highest in the monitoring priority to the port currently selected, and generates data for distinctly displaying the selected ports to be monitored and the other ports.

4. The network monitoring server according to claim 1, wherein the network further includes a switch device having no communication confirmation function, and wherein when the processor calculates the monitoring priority, the processor sets the monitoring priority of the ports of the switch device having no communication confirmation function to be lower than the monitoring priority of the ports of the switches each having the communication confirmation function, and calculates the monitoring priority of the ports that connect the device through the switch device having no communication confirmation function among the ports that connects between the switch devices each having the communication confirmation function on the basis of operating information on one or a plurality of devices connected through the switch device having no communication confirmation function.

5. The network monitoring server according to claim 1, wherein the network is connected with a management server that manages a device connected to the plurality of switch devices, wherein the management server transmits, to the network monitoring server, a configuration change notification message including identification information on the device and a configuration change time of the device, and wherein the processor calculates the monitoring priority of each port on the basis of the configuration change notification message received from the management server.

6. The network monitoring server according to claim 1, wherein the processor calculates the probability of failure of the device based on a degradation failure rate of the device or the switch devices calculated according to the accumulative operating time of the device or the accumulative operating time of each switch device.

7. The network monitoring server according to claim 1, wherein the processor calculates the accumulative operating time of the device or the accumulative operating time of each switch device based on a deployment date and time of the device or each switch device.

8. The network monitoring server according to claim 2, wherein the processor decreases the monitoring priority that has temporarily been increased after the given period of time elapses.

9. The network monitoring server according to claim 3, wherein when the processor generates the data for displaying, the processor generates data for distinctly displaying ports that are to be monitored and to which the point to be monitored has not yet been assigned, and ports that are to be monitored and to which the point to be monitored has been already assigned.

10. The network monitoring server according to claim 3, wherein the processor calculates the monitoring priority of each port of the plurality of switch devices every plurality of time points designated by a user in a period of time designated by the user, selects the ports to be monitored at each of the plurality of time points, and selects the ports to which the maintenance end points should be assigned or from which the maintenance end points should be deleted at each of the time points, on the basis of a difference between the ports to be monitored which have been selected at each of the time points and the ports to be monitored which have been selected before and after each of the time points, and generates data for displaying information on the selected ports to which the maintenance end points should be assigned or from which the maintenance end points should be deleted in association with each of the time points.

11. The network monitoring server according to claim 3, wherein the network is configured by a plurality of virtual networks, wherein each of the plurality of switches belongs to any one of the plurality of virtual networks, wherein when the processor generates the data for displaying, the processor selects the ports to be monitored in each of the plurality of virtual networks.

12. The network monitoring server according to claim 11, wherein the processor calculates, in each of the plurality of virtual networks, the monitoring priority of each port of each switch device belonging to the virtual network every plurality of time points designated by a user in a period of time designated by the user, selects the ports to be monitored at each of the plurality of time points, and selects the ports to which the maintenance end points should be assigned or from which the maintenance end points should be deleted at each of the time points in each of the virtual networks, on the basis of a difference between the ports to be monitored which have been selected at each of the time points and the ports to be monitored which have been selected before and after each of the time points, and generates data for displaying information on the selected ports to which the maintenance end points should be assigned or from which the maintenance end points should be deleted, each of the time points, and each of the virtual networks in association with each other.

13. A network monitoring system comprising:
a plurality of switch devices; and
a network monitoring server that monitors a network having the plurality of switch devices, wherein
the plurality of switch devices has a communication confirmation function using transmission and reception of a monitoring frame between ports, and an upper limit is set to the number of ports to which maintenance end points are assignable among the respective ports of the plurality of switch devices,
the network monitoring server includes a processor that executes a program, a memory that stores the program executed by the processor therein, and an interface that is connected to the processor,
the processor calculates, for each port of the plurality of switch devices, a monitoring priority corresponding to the probability of failures of a device connected to a network path having the port or the port, and generates data for displaying the calculated monitoring priority of each port in association with each port, and when the processor calculates the monitoring priority of a given port, the processor enhances the monitoring priority of the given port based on an accumulative operating time of a device connected to the given port or an accumulative operating time of each switch device that exists on a network path between one device connected to the given port and another device connected to the one device.

14. The network monitoring system according to claim 13, wherein when the processor calculates the monitoring priority of a given port, the processor temporarily increases the monitoring priority of the given port until a given period of time elapses since a device newly connected to the given port starts to operate.

15. The network monitoring system according to claim 13, wherein the processor calculates the probability of failure of the device based on a degradation failure rate of the device or the switch devices calculated according to the accumulative operating time of the device or the accumulative operating time of each switch device.

16. The network monitoring system according to claim 13, wherein the processor calculates the accumulative operating time of the device or the accumulative operating time of each switch device based on a deployment date and time of the device or each switch device.

17. The network monitoring system according to claim 14, wherein the processor decreases the monitoring priority that has temporarily been increased after the given period of time elapses.

* * * * *